United States Patent
Martin et al.

(10) Patent No.: US 12,070,042 B2
(45) Date of Patent: Aug. 27, 2024

(54) GRILL SYSTEMS

(71) Applicant: SharkNinja Operating LLC, Needham, MA (US)

(72) Inventors: Christopher T. Martin, North Attleboro, MA (US); Christopher Smith, Newton, MA (US); Blake Hishmeh, Cambridge, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/124,950

(22) Filed: Mar. 22, 2023

(65) Prior Publication Data

US 2024/0188577 A1   Jun. 13, 2024

Related U.S. Application Data

(63) Continuation of application No. 18/079,783, filed on Dec. 12, 2022, now abandoned.

(51) Int. Cl.
*A47J 37/07* (2006.01)
*A23B 4/052* (2006.01)
(Continued)

(52) U.S. Cl.
CPC .............. *A23B 4/0523* (2013.01); *A23L 5/17* (2016.08); *A47J 37/06* (2013.01)

(58) Field of Classification Search
CPC ........... A23B 4/0523; A23L 5/17; A47J 37/06
(Continued)

(56) References Cited

U.S. PATENT DOCUMENTS 3,933,145 A * 1/1976 Reich .................. A47J 37/0754
99/476
4,043,319 A * 8/1977 Jensen .................... B05B 16/60
55/DIG. 36
(Continued)

FOREIGN PATENT DOCUMENTS

AU    2009238211 B2    12/2014
AU    2014208185 B2    8/2015
(Continued)

OTHER PUBLICATIONS

U.S. Appl. No. 17/733,237 entitled "Grill System with Smoke Assembly" filed Apr. 29, 2022.

*Primary Examiner* — Avinash A Savani
(74) *Attorney, Agent, or Firm* — Mintz, Levin, Cohn, Ferris, Glovsky and Popeo, P.C.

(57) ABSTRACT

Cooking devices and methods of cooking are provided. The cooking devices can include a housing defining an interior cooking chamber, a fan disposed within the interior cooking chamber, a smoke unit coupled to an exterior of the housing, a smoke channel, and a limiter disposed at least partially within the smoke unit. The smoke unit is configured to generate smoke. The smoke channel has a first end in fluid communication with an interior of the smoke unit and a second end terminating within the interior cooking chamber proximate the fan such that a low-pressure zone created by operation of the fan causes smoke generated by the smoke unit to be drawn into the interior cooking chamber. The limiter is configured to reduce a volume of smoke being drawn through the smoke channel.

15 Claims, 19 Drawing Sheets

(51) Int. Cl.
*A23L 5/10* (2016.01)
*A47J 37/06* (2006.01)

(58) Field of Classification Search
USPC ...................................................... 126/25 R
See application file for complete search history.

(56) References Cited

U.S. PATENT DOCUMENTS

| | | | |
|---|---|---|---|
| 4,627,408 A | 12/1986 | Schlosser | |
| 4,727,853 A | 3/1988 | Stephen et al. | |
| 4,781,170 A | 11/1988 | Perl | |
| 4,805,587 A | 2/1989 | Schweitzer | |
| 4,827,903 A | 5/1989 | Kim | |
| 4,829,978 A | 5/1989 | Schlosser | |
| 4,865,219 A | 9/1989 | Logan et al. | |
| 5,755,154 A | 5/1998 | Schroeter et al. | |
| 5,782,230 A | 7/1998 | Linnebur et al. | |
| 5,996,572 A * | 12/1999 | Ilagan | A47J 37/0786 126/30 |
| 6,235,210 B1 * | 5/2001 | Saksena | A47J 37/1238 210/791 |
| 6,708,604 B1 * | 3/2004 | Deichler, Jr. | A47J 37/0763 99/449 |
| 6,810,792 B1 | 11/2004 | Knight | |
| 6,844,530 B2 | 1/2005 | Bennett et al. | |
| 6,868,777 B1 * | 3/2005 | Higgins | A23B 4/044 426/314 |
| 6,941,857 B2 | 9/2005 | Mclemore | |
| 7,263,987 B2 | 9/2007 | Sung et al. | |
| 7,412,922 B2 | 8/2008 | Mclemore | |
| 7,426,885 B2 | 9/2008 | Mclemore et al. | |
| 7,619,183 B2 | 11/2009 | Conrad | |
| 7,626,142 B2 | 12/2009 | Backus et al. | |
| 7,703,389 B2 | 4/2010 | Mclemore et al. | |
| D616,243 S | 5/2010 | Mclemore et al. | |
| 7,757,604 B2 | 7/2010 | Gonzalez | |
| 7,798,139 B2 | 9/2010 | Gagas et al. | |
| 7,832,330 B1 | 11/2010 | Thompson | |
| 7,874,289 B2 | 1/2011 | Larsen | |
| 7,981,459 B2 | 7/2011 | Mclemore | |
| 8,037,879 B2 | 10/2011 | Murrin et al. | |
| 8,042,459 B2 | 10/2011 | Wu | |
| 8,109,263 B2 | 2/2012 | Pliml | |
| 8,276,505 B2 | 10/2012 | Buehler | |
| 8,304,696 B2 | 11/2012 | Knight | |
| 8,481,894 B2 | 7/2013 | Robin et al. | |
| 8,669,499 B2 | 3/2014 | Conrad | |
| 8,669,500 B2 | 3/2014 | Hensel et al. | |
| 8,748,783 B2 | 6/2014 | Hensel et al. | |
| 8,776,675 B1 | 7/2014 | Meris et al. | |
| 8,800,542 B1 * | 8/2014 | Kennington | F24B 15/005 99/333 |
| 8,820,219 B2 | 9/2014 | Buehler | |
| 8,878,106 B2 | 11/2014 | Hensel et al. | |
| 8,931,400 B1 | 1/2015 | Allen | |
| 8,991,386 B2 | 3/2015 | Ahmed | |
| 9,022,018 B2 | 5/2015 | Hensel et al. | |
| 9,057,526 B2 | 6/2015 | Barritt | |
| 9,226,615 B2 | 1/2016 | Hofmann | |
| 9,375,021 B2 | 6/2016 | Raghavan et al. | |
| 9,402,505 B2 | 8/2016 | Johncock et al. | |
| 9,433,322 B2 | 9/2016 | Axinte et al. | |
| 9,441,838 B2 | 9/2016 | Baker | |
| 9,486,000 B2 | 11/2016 | Kaderli | |
| D775,489 S * | 1/2017 | Zemel | D7/332 |
| 9,603,372 B2 | 3/2017 | Bader | |
| 9,631,820 B2 | 4/2017 | Hensel et al. | |
| 9,788,688 B1 | 10/2017 | Ficarra | |
| 9,799,199 B2 | 10/2017 | Allen | |
| 9,844,297 B2 | 12/2017 | Volatier et al. | |
| 9,883,770 B2 | 2/2018 | Hunt et al. | |
| 9,930,897 B2 | 4/2018 | Blue et al. | |
| 10,021,887 B2 | 7/2018 | Mclemore et al. | |
| 10,021,888 B2 | 7/2018 | Mclamb | |
| 10,045,546 B2 | 8/2018 | Giebel et al. | |
| 10,058,211 B2 | 8/2018 | Perez | |
| 10,058,212 B2 | 8/2018 | Barajas et al. | |
| 10,067,004 B1 | 9/2018 | Allen | |
| 10,105,007 B2 | 10/2018 | Colston et al. | |
| 10,140,587 B2 | 11/2018 | Garden | |
| 10,149,573 B2 | 12/2018 | Volatier et al. | |
| 10,158,720 B2 | 12/2018 | Colston | |
| 10,218,833 B2 | 2/2019 | Colston | |
| 10,222,058 B2 | 3/2019 | Yoon | |
| 10,271,559 B2 | 4/2019 | Nitta et al. | |
| 10,292,531 B1 | 5/2019 | Hancock et al. | |
| 10,307,016 B2 | 6/2019 | Johncock et al. | |
| 10,327,584 B2 | 6/2019 | Shingler et al. | |
| 10,327,588 B2 | 6/2019 | Dahle et al. | |
| 10,327,589 B1 | 6/2019 | Dahle et al. | |
| 10,339,783 B2 | 7/2019 | Allen, Sr. | |
| 10,342,385 B2 | 7/2019 | Cedar et al. | |
| 10,383,477 B2 | 8/2019 | Payen et al. | |
| 10,388,141 B2 | 8/2019 | Allen, Sr. | |
| 10,395,506 B2 | 8/2019 | Allen, Sr. | |
| 10,426,176 B2 | 10/2019 | Dixon et al. | |
| 10,451,288 B2 | 10/2019 | Lee et al. | |
| 10,455,022 B2 | 10/2019 | Colston | |
| 10,455,979 B2 | 10/2019 | Colston et al. | |
| 10,478,016 B2 | 11/2019 | Mclemore et al. | |
| 10,491,738 B2 | 11/2019 | Colston | |
| 10,517,427 B2 | 12/2019 | Hackley | |
| 10,520,202 B2 | 12/2019 | Delrue et al. | |
| 10,524,312 B2 | 12/2019 | Knappenberger et al. | |
| 10,537,199 B2 | 1/2020 | Knappenberger et al. | |
| 10,551,893 B2 | 2/2020 | Knappenberger et al. | |
| 10,559,186 B2 | 2/2020 | Allen, Sr. | |
| 10,588,457 B2 | 3/2020 | Hingorani | |
| 10,588,461 B2 | 3/2020 | Dahle | |
| 10,624,358 B2 | 4/2020 | Akinbobola et al. | |
| 10,641,495 B2 | 5/2020 | Hamm | |
| 10,652,386 B2 | 5/2020 | Colston | |
| 10,660,473 B2 | 5/2020 | Dahle et al. | |
| 10,674,866 B2 | 6/2020 | Colston | |
| 10,682,010 B2 | 6/2020 | Hoare et al. | |
| 10,694,892 B2 | 6/2020 | Colston | |
| 10,701,199 B2 | 6/2020 | Colston | |
| 10,708,409 B2 | 7/2020 | Colston | |
| 10,718,671 B2 | 7/2020 | Allen | |
| 10,735,523 B2 | 8/2020 | Colston | |
| 10,735,575 B2 | 8/2020 | Colston | |
| 10,757,244 B2 | 8/2020 | Colston | |
| 10,764,423 B2 | 9/2020 | Colston | |
| 10,772,467 B2 | 9/2020 | Dahle | |
| 10,785,363 B2 | 9/2020 | Colston | |
| 10,789,827 B2 | 9/2020 | Allen, Sr. | |
| 10,791,208 B2 | 9/2020 | Colston | |
| 10,806,301 B2 | 10/2020 | Hancock et al. | |
| 10,888,193 B2 | 1/2021 | Dahle et al. | |
| 10,905,281 B2 | 2/2021 | Delrue et al. | |
| 10,912,413 B2 | 2/2021 | Walters et al. | |
| 10,951,751 B2 | 3/2021 | Colston | |
| 10,952,564 B2 | 3/2021 | Dahle et al. | |
| 10,959,572 B2 | 3/2021 | Dahle et al. | |
| 10,982,845 B2 | 4/2021 | Yoon | |
| 10,986,960 B2 | 4/2021 | Colston | |
| 10,995,964 B2 | 5/2021 | Dahle | |
| 11,006,646 B2 | 5/2021 | Garces et al. | |
| 11,064,837 B2 | 7/2021 | Yang et al. | |
| 11,076,608 B2 | 8/2021 | Hall et al. | |
| 11,109,600 B2 | 9/2021 | Jackson | |
| 11,129,244 B2 | 9/2021 | Hoare et al. | |
| 11,132,885 B2 | 9/2021 | Allen, Sr. | |
| 11,162,684 B2 | 11/2021 | Colston et al. | |
| 11,172,688 B2 | 11/2021 | Powell et al. | |
| 11,181,276 B2 | 11/2021 | Colston et al. | |
| 11,181,277 B2 | 11/2021 | Donnelly et al. | |
| 11,190,015 B2 | 11/2021 | Marsh-Croft et al. | |
| 11,197,579 B2 | 12/2021 | Volatier | |
| 11,202,454 B2 | 12/2021 | Leibell | |
| 11,206,307 B2 | 12/2021 | Colston | |
| 11,206,948 B2 | 12/2021 | Measom et al. | |
| 11,248,798 B2 | 2/2022 | Donnelly et al. | |

(56) References Cited

U.S. PATENT DOCUMENTS

| | | |
|---|---|---|
| 11,248,799 B2 | 2/2022 | Donnelly et al. |
| 11,248,800 B2 | 2/2022 | Donnelly et al. |
| 11,248,801 B2 | 2/2022 | Donnelly et al. |
| 11,250,686 B2 | 2/2022 | Allen, Sr. |
| 11,322,012 B2 | 5/2022 | Allen, Sr. |
| 11,324,357 B2 | 5/2022 | Colston |
| 11,359,817 B2 | 6/2022 | Donnelly et al. |
| 11,371,712 B2 | 6/2022 | Donnelly et al. |
| 11,375,725 B1 | 7/2022 | Morales |
| 11,382,457 B2 | 7/2022 | Carter et al. |
| 11,391,464 B2 | 7/2022 | Ahmed et al. |
| 11,412,888 B2 | 8/2022 | Hackley |
| 11,435,074 B2 | 9/2022 | Rahmani et al. |
| 11,439,275 B2 | 9/2022 | Morelock et al. |
| 11,445,857 B2 | 9/2022 | James et al. |
| 11,454,677 B2 | 9/2022 | Knappenberger et al. |
| 11,457,771 B2 | 10/2022 | Jan et al. |
| 11,464,363 B2 | 10/2022 | O'shaughnessy et al. |
| 11,478,107 B2 | 10/2022 | Volatier |
| 11,490,763 B2 | 11/2022 | Wu et al. |
| 11,497,349 B2 | 11/2022 | Meadows et al. |
| 11,510,524 B2 | 11/2022 | Pruitt et al. |
| 11,510,526 B2 | 11/2022 | Hunt et al. |
| 11,528,918 B2 | 12/2022 | Dean |
| 11,553,818 B2 | 1/2023 | Simon et al. |
| 11,598,532 B2 | 3/2023 | Reid et al. |
| 11,622,007 B2 | 4/2023 | Colston |
| 11,622,008 B2 | 4/2023 | Colston |
| 11,622,420 B2 | 4/2023 | Knappenberger et al. |
| 2009/0078127 A1 | 3/2009 | Mclemore et al. |
| 2009/0087534 A1 | 4/2009 | Mclemore |
| 2011/0147376 A1 | 6/2011 | Ueda et al. |
| 2012/0009317 A1 | 1/2012 | Mclemore |
| 2012/0192726 A1 | 8/2012 | Clearman et al. |
| 2012/0266856 A1 | 10/2012 | Zelek et al. |
| 2015/0025687 A1 | 1/2015 | Henderson et al. |
| 2017/0202394 A1 | 7/2017 | Olsen |
| 2018/0028018 A1 | 2/2018 | Barnett et al. |
| 2018/0168397 A1 | 6/2018 | Colston |
| 2018/0279633 A1 | 10/2018 | Qiu |
| 2018/0296031 A1 | 10/2018 | Terrell, Jr. et al. |
| 2018/0325314 A1 | 11/2018 | Walters |
| 2018/0360058 A1 | 12/2018 | Giebel et al. |
| 2018/0360059 A1 | 12/2018 | Giebel et al. |
| 2018/0368617 A1 | 12/2018 | Allmendinger |
| 2019/0090688 A1 | 3/2019 | Wilson |
| 2019/0116819 A1 | 4/2019 | Capriglione |
| 2019/0282031 A1 | 9/2019 | Feng |
| 2019/0290062 A1 | 9/2019 | Prieto et al. |
| 2019/0290064 A1 | 9/2019 | Colston et al. |
| 2019/0290069 A1 | 9/2019 | Colston et al. |
| 2019/0313849 A1 | 10/2019 | Yin et al. |
| 2019/0320669 A1 | 10/2019 | Powell et al. |
| 2020/0093145 A1 | 3/2020 | Powell et al. |
| 2020/0100615 A1 | 4/2020 | Knappenberger et al. |
| 2020/0116349 A1 | 4/2020 | Rahmani et al. |
| 2020/0200393 A1 | 6/2020 | Goldberg et al. |
| 2020/0201414 A1 | 6/2020 | Knappenberger et al. |
| 2020/0214501 A1 | 7/2020 | Gafford et al. |
| 2020/0214503 A1 | 7/2020 | Altenritter |
| 2020/0237139 A1 | 7/2020 | Colston |
| 2020/0237146 A1 | 7/2020 | Donnelly et al. |
| 2020/0237148 A1 | 7/2020 | Donnelly et al. |
| 2020/0275804 A1 | 9/2020 | Dahle |
| 2020/0358893 A1 | 11/2020 | Colston |
| 2020/0405085 A1 | 12/2020 | Dos Santos et al. |
| 2020/0405086 A1 | 12/2020 | Dos Santos et al. |
| 2021/0007550 A1 | 1/2021 | Puertas et al. |
| 2021/0052108 A1 | 2/2021 | Dahle |
| 2021/0123601 A1 | 4/2021 | Martin et al. |
| 2021/0161151 A1 | 6/2021 | Thorogood et al. |
| 2021/0169269 A1 | 6/2021 | Meadows et al. |
| 2021/0196078 A1 | 7/2021 | Colston et al. |
| 2021/0196079 A1 | 7/2021 | Dahle et al. |
| 2021/0228020 A1 | 7/2021 | Hanks et al. |
| 2021/0235927 A1 | 8/2021 | Colston |
| 2021/0244233 A1 | 8/2021 | Bush et al. |
| 2021/0251423 A1 | 8/2021 | Dahle et al. |
| 2021/0267413 A1 | 9/2021 | Roberts et al. |
| 2021/0282590 A1 | 9/2021 | Dahle et al. |
| 2021/0293413 A1 | 9/2021 | Donnelly et al. |
| 2021/0302027 A1 | 9/2021 | Dahle |
| 2021/0310665 A1 | 10/2021 | Lam |
| 2021/0315416 A1 | 10/2021 | Fullmer et al. |
| 2021/0352923 A1 | 11/2021 | Li et al. |
| 2021/0369051 A1 | 12/2021 | Thorogood et al. |
| 2021/0369052 A1 | 12/2021 | Fullmer et al. |
| 2022/0007689 A1 | 1/2022 | Baldwin |
| 2022/0031107 A1 | 2/2022 | Dixon et al. |
| 2022/0046936 A1 | 2/2022 | Neuman |
| 2022/0046937 A1 | 2/2022 | Simon et al. |
| 2022/0061589 A1 | 3/2022 | Dotson et al. |
| 2022/0071444 A1 | 3/2022 | Springer |
| 2022/0086232 A1 | 3/2022 | Colston |
| 2022/0087475 A1 | 3/2022 | Terrell et al. |
| 2022/0132874 A1 | 5/2022 | Dean |
| 2022/0160174 A1 | 5/2022 | Matz |
| 2022/0214040 A1 | 7/2022 | Zheng |
| 2022/0223025 A1 | 7/2022 | Allen, Sr. |
| 2022/0225827 A1 | 7/2022 | Hill |
| 2022/0232116 A1 | 7/2022 | Colston |
| 2022/0232117 A1 | 7/2022 | Colston |
| 2022/0233021 A1 | 7/2022 | Zheng |
| 2022/0235941 A1 | 7/2022 | Yu |
| 2022/0248696 A1 | 8/2022 | Hastings |
| 2022/0248903 A1 | 8/2022 | Parker et al. |
| 2022/0257051 A1 | 8/2022 | Colston |
| 2022/0290865 A1 | 9/2022 | Simon et al. |
| 2022/0296043 A1 | 9/2022 | Colston et al. |
| 2022/0299207 A1 | 9/2022 | Bennett |
| 2022/0307683 A1 | 9/2022 | Dykes et al. |
| 2022/0322874 A1 | 10/2022 | Marsh-croft et al. |
| 2022/0333785 A1 | 10/2022 | Shoeb et al. |
| 2022/0338493 A1 | 10/2022 | Ish-hurwitz et al. |
| 2022/0354141 A1 | 11/2022 | Drinkwater et al. |
| 2022/0361515 A1 | 11/2022 | Carballo et al. |
| 2022/0378056 A1 | 12/2022 | Simon et al. |
| 2022/0412549 A1 | 12/2022 | Rahmani et al. |
| 2023/0038171 A1 | 2/2023 | Stidston et al. |
| 2023/0038336 A1 | 2/2023 | Hyde et al. |
| 2023/0043473 A1 | 2/2023 | Hyde et al. |
| 2023/0044392 A1 | 2/2023 | Hyde et al. |

FOREIGN PATENT DOCUMENTS

| | | |
|---|---|---|
| AU | 2015255207 B2 | 9/2016 |
| AU | 2016297715 A1 | 3/2017 |
| AU | 2016216635 A1 | 5/2017 |
| AU | 2016276039 A1 | 12/2017 |
| AU | 2016276160 A1 | 1/2018 |
| AU | 2018251790 A1 | 10/2019 |
| AU | 2019202070 A1 | 10/2019 |
| AU | 2019202071 A1 | 10/2019 |
| AU | 2019202074 A1 | 10/2019 |
| AU | 2019202075 A1 | 10/2019 |
| AU | 2019280574 B2 | 1/2021 |
| AU | 2019342959 A1 | 4/2021 |
| AU | 2021202627 A1 | 5/2021 |
| AU | 2019359493 A1 | 6/2021 |
| AU | 2019364217 A1 | 6/2021 |
| AU | 2020286227 A1 | 6/2021 |
| AU | 2020319805 A1 | 2/2022 |
| AU | 2020347101 A1 | 4/2022 |
| AU | 2019423840 B2 | 5/2022 |
| AU | 2019424802 B2 | 7/2022 |
| AU | 2019424191 B2 | 8/2022 |
| AU | 2019424192 B2 | 8/2022 |
| AU | 2019424803 B2 | 8/2022 |
| AU | 2019423839 B2 | 9/2022 |
| AU | 2019424099 B2 | 9/2022 |
| AU | 2019424100 B2 | 9/2022 |
| AU | 2019424805 B2 | 10/2022 |
| AU | 2022256109 A1 | 11/2022 |
| AU | 2019342959 B2 | 4/2023 |

(56) References Cited

FOREIGN PATENT DOCUMENTS

| | | |
|---|---|---|
| AU | 2021339461 A8 | 4/2023 |
| CA | 2252213 A1 | 4/2000 |
| CA | 2146872 C | 2/2002 |
| CA | 2569972 C | 7/2012 |
| CA | 2535012 C | 6/2015 |
| CA | 2721322 C | 10/2016 |
| CA | 2988570 A1 | 12/2016 |
| CA | 2995405 A1 | 12/2016 |
| CA | 2941277 A1 | 4/2017 |
| CA | 2962832 A1 | 4/2017 |
| CA | 2969476 A1 | 4/2017 |
| CA | 3057846 A1 | 10/2018 |
| CA | 3099391 A1 | 11/2018 |
| CA | 3129669 A1 | 11/2018 |
| CA | 2911721 C | 1/2019 |
| CA | 3037207 A1 | 3/2019 |
| CA | 3145603 A1 | 4/2019 |
| CA | 3036777 A1 | 9/2019 |
| CA | 3037934 A1 | 9/2019 |
| CA | 3037936 A1 | 9/2019 |
| CA | 3037937 A1 | 9/2019 |
| CA | 3038088 A1 | 9/2019 |
| CA | 3098877 A1 | 11/2019 |
| CA | 3127374 A1 | 12/2019 |
| CA | 3111352 A1 | 3/2020 |
| CA | 3115989 A1 | 4/2020 |
| CA | 3066299 A1 | 7/2020 |
| CA | 3122495 A1 | 7/2020 |
| CA | 3122497 A1 | 7/2020 |
| CA | 3122512 A1 | 7/2020 |
| CA | 3122516 A1 | 7/2020 |
| CA | 3122519 A1 | 7/2020 |
| CA | 3122521 A1 | 7/2020 |
| CA | 3122523 A1 | 7/2020 |
| CA | 3122525 A1 | 7/2020 |
| CA | 3122657 A1 | 7/2020 |
| CA | 3136333 A1 | 11/2020 |
| CA | 3000527 C | 12/2020 |
| CA | 2971815 C | 1/2021 |
| CA | 3159171 A1 | 7/2021 |
| CA | 3112101 A1 | 9/2021 |
| CA | 3000542 C | 11/2021 |
| CA | 3101997 C | 11/2021 |
| CA | 2971814 C | 12/2021 |
| CA | 3066299 C | 4/2022 |
| CA | 3094309 C | 8/2022 |
| CA | 3151454 A1 | 9/2022 |
| CA | 3102207 C | 3/2023 |
| CN | 1287717 C | 12/2006 |
| CN | 102007345 B | 1/2013 |
| CN | 203328547 U | 12/2013 |
| CN | 101119664 B | 7/2014 |
| CN | 203852233 U | 10/2014 |
| CN | 105167640 A | 12/2015 |
| CN | 101953645 B | 1/2016 |
| CN | 105662170 A | 6/2016 |
| CN | 205391021 U | 7/2016 |
| CN | 103917145 B | 11/2016 |
| CN | 206053603 U | 3/2017 |
| CN | 206062956 U | 4/2017 |
| CN | 106963248 A | 7/2017 |
| CN | 206295269 U | 7/2017 |
| CN | 105167640 B | 8/2017 |
| CN | 104797177 B | 10/2017 |
| CN | 107251507 A | 10/2017 |
| CN | 107347967 A | 11/2017 |
| CN | 104885560 B | 1/2018 |
| CN | 107529920 A | 1/2018 |
| CN | 105662170 B | 2/2018 |
| CN | 206979387 U | 2/2018 |
| CN | 107920679 A | 4/2018 |
| CN | 108093620 A | 5/2018 |
| CN | 108185836 A | 6/2018 |
| CN | 108433563 A | 8/2018 |
| CN | 106963248 B | 1/2019 |
| CN | 208510814 U | 2/2019 |
| CN | 208524651 U | 2/2019 |
| CN | 209300859 U | 8/2019 |
| CN | 209377377 U | 9/2019 |
| CN | 110353518 A | 10/2019 |
| CN | 110353519 A | 10/2019 |
| CN | 110353520 A | 10/2019 |
| CN | 110353525 A | 10/2019 |
| CN | 209489913 U | 10/2019 |
| CN | 209826361 U | 12/2019 |
| CN | 107565511 B | 1/2020 |
| CN | 110958837 A | 4/2020 |
| CN | 107562115 B | 5/2020 |
| CN | 111493681 A | 8/2020 |
| CN | 211212757 U | 8/2020 |
| CN | 211372488 U | 8/2020 |
| CN | 108808621 B | 9/2020 |
| CN | 211795985 U | 10/2020 |
| CN | 112103909 A | 12/2020 |
| CN | 112261894 A | 1/2021 |
| CN | 113163983 A | 7/2021 |
| CN | 113208460 A | 8/2021 |
| CN | 113226130 A | 8/2021 |
| CN | 113226131 A | 8/2021 |
| CN | 113226132 A | 8/2021 |
| CN | 113226133 A | 8/2021 |
| CN | 113227651 A | 8/2021 |
| CN | 113260289 A | 8/2021 |
| CN | 113260290 A | 8/2021 |
| CN | 113260291 A | 8/2021 |
| CN | 113272862 A | 8/2021 |
| CN | 113316409 A | 8/2021 |
| CN | 113453598 A | 9/2021 |
| CN | 106998964 B | 10/2021 |
| CN | 114041028 A | 2/2022 |
| CN | 215738499 U | 2/2022 |
| CN | 110880738 B | 3/2022 |
| CN | 114423292 A | 4/2022 |
| CN | 216221239 U | 4/2022 |
| CN | 108803767 B | 7/2022 |
| CN | 111522388 B | 7/2022 |
| CN | 114901109 A | 8/2022 |
| CN | 110996668 B | 9/2022 |
| DE | 212016000022 U1 | 8/2017 |
| DE | 212016000157 U1 | 3/2018 |
| DE | 102019107552 A8 | 3/2020 |
| EP | 1400195 B1 | 2/2005 |
| EP | 1403587 B1 | 5/2006 |
| EP | 1517093 B1 | 7/2006 |
| EP | 1466546 B1 | 11/2006 |
| EP | 1514502 B1 | 12/2006 |
| EP | 1800579 B1 | 12/2008 |
| EP | 1795096 B1 | 6/2009 |
| EP | 2304322 A4 | 4/2014 |
| EP | 2605690 B1 | 11/2014 |
| EP | 2433530 B1 | 12/2014 |
| EP | 2342500 B1 | 12/2016 |
| EP | 2304322 B1 | 5/2017 |
| EP | 2915411 B1 | 12/2017 |
| EP | 2986130 B1 | 2/2018 |
| EP | 3273558 A3 | 4/2018 |
| EP | 3366023 A1 | 8/2018 |
| EP | 2739191 B1 | 9/2018 |
| EP | 3399836 A1 | 11/2018 |
| EP | 3366023 A4 | 4/2019 |
| EP | 3473106 A1 | 4/2019 |
| EP | 3364838 A4 | 5/2019 |
| EP | 3473106 B1 | 5/2020 |
| EP | 3677157 A1 | 7/2020 |
| EP | 3375335 B1 | 8/2020 |
| EP | 3552528 B1 | 3/2021 |
| EP | 3648608 A4 | 3/2021 |
| EP | 3644746 A4 | 6/2021 |
| EP | 3865031 A1 | 8/2021 |
| EP | 3399613 B1 | 9/2021 |
| EP | 3870008 A1 | 9/2021 |
| EP | 3366015 B1 | 11/2021 |
| EP | 3913878 A1 | 11/2021 |
| EP | 3944444 A1 | 1/2022 |

(56) References Cited

FOREIGN PATENT DOCUMENTS

| | | |
|---|---|---|
| EP | 3450855 B1 | 6/2022 |
| EP | 4027795 A1 | 7/2022 |
| EP | 3294039 B1 | 8/2022 |
| EP | 3870008 A4 | 8/2022 |
| EP | 4079201 A1 | 10/2022 |
| EP | 4110063 A1 | 1/2023 |
| EP | 4099798 A3 | 2/2023 |
| EP | 4136978 A1 | 2/2023 |
| FR | 2893832 B1 | 2/2012 |
| FR | 3079600 B1 | 9/2020 |
| FR | 3117325 A1 | 6/2022 |
| GB | 201720729 | 1/2018 |
| GB | 2555054 A | 4/2018 |
| GB | 2558532 A | 7/2018 |
| GB | 201904197 | 5/2019 |
| GB | 201904199 | 5/2019 |
| GB | 201904200 | 5/2019 |
| GB | 2572489 A | 10/2019 |
| GB | 2572491 A | 10/2019 |
| GB | 2572492 A | 10/2019 |
| GB | 2572261 B | 6/2020 |
| GB | 202018759 | 1/2021 |
| GB | 2558089 B | 3/2022 |
| GB | 2557057 B | 7/2022 |
| GB | 2600024 B | 7/2022 |
| GB | 2601909 B | 8/2022 |
| JP | 2018526036 A | 9/2018 |
| KR | 20180039541 A | 4/2018 |
| KR | 20180067383 A | 6/2018 |
| WO | 2005016091 A1 | 2/2005 |
| WO | 2015175366 A1 | 11/2015 |
| WO | 2016200650 A1 | 12/2016 |
| WO | 2016200678 A1 | 12/2016 |
| WO | 2018191372 A1 | 10/2018 |
| WO | 2018208919 A1 | 11/2018 |
| WO | 2019204723 A1 | 10/2019 |
| WO | 2019236423 A1 | 12/2019 |
| WO | 2020060687 A1 | 3/2020 |
| WO | 2020077366 A1 | 4/2020 |
| WO | 2020154014 A1 | 7/2020 |
| WO | 2020154015 A1 | 7/2020 |
| WO | 2020154016 A1 | 7/2020 |
| WO | 2020154017 A1 | 7/2020 |
| WO | 2020154018 A1 | 7/2020 |
| WO | 2020154019 A1 | 7/2020 |
| WO | 2020154020 A1 | 7/2020 |
| WO | 2020154021 A1 | 7/2020 |
| WO | 2020154022 A1 | 7/2020 |
| WO | 2021020974 A1 | 2/2021 |
| WO | 2021138455 A4 | 9/2021 |
| WO | 2022051800 A1 | 3/2022 |
| WO | 2023272336 A1 | 1/2023 |
| WO | 2023004464 A1 | 2/2023 |
| WO | 2023014440 A1 | 2/2023 |

* cited by examiner

[180]

[190]

GRILL SYSTEMS

CROSS REFERENCE TO RELATED APPLICATION

The present Application is a continuation of U.S. patent application Ser. No. 18/079,783, filed Dec. 12, 2022, entitled "GRILL SYSTEMS", which is incorporated by reference herein.

FIELD

A grill system including a smoke assembly, and methods for cooking, are provided.

BACKGROUND

Smoke can be used in a variety of cooking devices and with a variety of cooking operations to impart flavor. As an example, grills and grilling devices can come equipped with smoking capabilities, or the means with which to impart smoke flavor into food cooked with these grills and grilling devices. However, electric cooking appliances may only be able to impart limited smoke flavor or no smoke flavor into food cooked therewith. Further, in grilling systems which impart smoke flavor into food, control of the smoke output can be challenging.

Accordingly, there remains a need for an improved grill system with a smoke assembly.

SUMMARY

A cooking device, a smoke assembly, and methods of cooking food using a cooking device with a smoke assembly are provided. Related apparatuses and techniques are also described.

In an embodiment, a cooking device is provided, including a housing defining an interior cooking chamber, a fan disposed within the interior cooking chamber, a smoke unit coupled to an exterior of the housing, and a smoke channel as least partially defined by a contour of the housing. The smoke unit can be configured to generate smoke. The smoke channel can have a first end in fluid communication with an interior of the smoke unit and a second end terminating within the interior cooking chamber proximate the fan such that a low-pressure zone created by operation of the fan causes smoke generated by the smoke unit to be drawn into the interior cooking chamber.

The cooking device can vary in a variety of ways. For example, the smoke channel can define a recirculation opening configured to take in air circulating within the interior cooking chamber. For example, the housing can include a lid movably coupled to a base, and the fan can be disposed on the lid. In some aspects, the fan can be configured to rotate about a vertical axis to cause air to circulate within the hollow cooking chamber in a toroidal pattern. For example, the housing can include a front door movably coupled to a housing body, and the fan can be disposed on the housing directly opposite the front door. In some aspects, the fan can be configured to rotate about a horizontal axis. For example, the smoke unit can be removably coupled to an exterior of the lid. For example, the first end of the smoke channel can be located on a side of the lid and the second end of the smoke channel can be located on a top of the lid.

In another embodiment, a cooking device is provided, including a base and a lid movably coupled to the base, a smoke unit coupled to an external surface of the lid, a fan, and a smoke channel at least partially defined by the lid. The base and the lid can define an interior cooking chamber configured to cook a food product disposed therein. The smoke unit can be configured to generate smoke to flavor the food product. The fan can be located within the interior cooking chamber and can be configured to circulate air within the interior cooking chamber. The smoke channel can have a first end in fluid communication with the smoke unit and a second end located within the interior cooking chamber and proximate the fan. Operation of the fan can create a low pressure zone near the second end of the smoke channel, and the low pressure zone can cause smoke generated by the smoke unit to be pulled through the smoke channel and into the interior cooking chamber.

The cooking device can vary in a variety of ways. For example, the smoke unit can be removably coupled to the external surface. For example, the first end of the smoke channel can be located on a side of the lid and the second end of the smoke channel can be located on a top of the lid. In some variations, the smoke channel can be shaped to match a contour of the lid. In other variations, the second end of the smoke channel can be located within a low pressure zone generated by rotation of the fan. For example, the fan can be configured to rotate about a vertical axis to cause air to circulate within the hollow cooking chamber in a toroidal pattern. For example, the smoke channel can define a recirculation opening configured to take in air circulating within the interior cooking chamber.

In another embodiment, a method of cooking is provided. The method can include generating smoke using a smoke unit coupled to an external surface of a housing of a cooking device, and operating a fan disposed within the interior cooking chamber to circulate air within the interior cooking chamber. The housing can define an interior cooking chamber configured to receive a food product. Operation of the fan can cause smoke generated by the smoke unit to be drawn into a first end of a smoke channel at least partially defined by the housing and out of a second end of the smoke channel disposed proximate the fan and within the interior cooking chamber.

The method can vary in a variety of ways. For example, the method can further include decoupling the smoke unit from the external surface of the housing. For example, the housing can include a lid movably coupled to a base, and the smoke unit can be removably coupled to an external surface of the lid. For example, operating the fan can cause the fan to create a low pressure zone proximate the fan, and the second end of the smoke channel can be disposed within the low pressure zone. For example, the first end of the smoke channel can be located on a side of the housing, and the second end of the smoke channel can be located on a top of the housing.

In another embodiment, a cooking device is provided. The cooking device can include a housing defining an interior chamber, a smoke unit coupled to an exterior of the housing, a fan disposed within the interior chamber, and a valve disposed at least partially in the flow path. The smoke unit can be configured to generate smoke. The fan can be configured to draw air along a flow path initiating within the smoke unit and terminating in the interior chamber. The fan can also be configured to create a low-pressure zone to cause smoke generated by the smoke unit to travel along the flow path. The valve can be movable between a first position in which the flow path is blocked and a second position in which the flow path is unobstructed.

The cooking device can vary in a variety of ways. For example, the smoke unit can include a vent in fluid communication with ambient air, and the valve can obstruct the vent in the second position. In some variations, the valve can be a butterfly valve configured to pivot between the first position and the second position. In other variations, the valve can be a ball valve coupled to a handle extending from the smoke unit. The ball valve can be movable via rotation of the handle. In some aspects, the ball valve can include a sharpened edge configured to break creosote buildup.

In another embodiment, a cooking device is provided. The cooking device can include a base and a lid movably coupled to the base, a smoke unit coupled to an external surface of the lid, a fan disposed within the interior chamber, and a limiter in fluid communication with the flow path. The base and the lid can define an interior chamber configured to cook a food product disposed therein. The smoke unit can be configured to generate smoke to flavor the food product. The fan can be configured to draw air along a flow path initiating within the smoke unit and terminating in the interior chamber, and the fan also be configured to create a low-pressure zone to cause smoke generated by the smoke unit to travel on the flow path. The limiter can be configured to reduce a volume of smoke flowing through the smoke channel.

The cooking device can vary in a variety of ways. For example, the smoke unit can include a vent, and the limiter can be disposed at least partially within the smoke unit and include a valve selectively movable between a first position in which the flow path is unobstrucated and the vent is obstructed by the valve and a second position in which the flow path is obstructed by the valve and the vent is open. In some variations, the valve can be a butterfly valve configured to pivot between the first position and the second position. In other variations, the valve can be a ball valve coupled to a handle extending from the smoke unit. The ball valve can be movable via rotation of the handle. For example, the limiter can include a solid block disposed within the smoke unit and configured to reduce a fuel capacity of the smoke unit. For example, the cooking device can further include an exhaust extending from the lid, and the limiter can include a recirculation opening on the exhaust to fluidly link the exhaust and the interior chamber.

In another embodiment, a method of cooking is provided. The method can include generating smoke using a smoke unit coupled to an external surface of a housing of a cooking device, the housing defining an interior chamber configured to receive a food product. The method can also include operating a fan disposed within the interior chamber to draw air along a flow path initiating within the smoke unit and terminating in the interior chamber. The method can further include actuating a limiter to reduce an amount of smoke drawn into the first end of the smoke channel.

The method can vary in a variety of ways. For example, the smoke unit can include a vent, and the limiter can include a valve that, when the limiter is actuated, is moved from a first position in which the flow path is unobstructed and the vent is obstructed by the valve to a second position in which the flow path is obstructed by the valve and the vent is unobstructed. In some variations, the valve can be a butterfly valve that, when the limiter is actuated, pivots between the first position and the second position. In other variations, the valve can be a ball valve coupled to a handle extending from the smoke unit that, when the limiter is actuated, rotates between the first position and the second position.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

Figure 1:
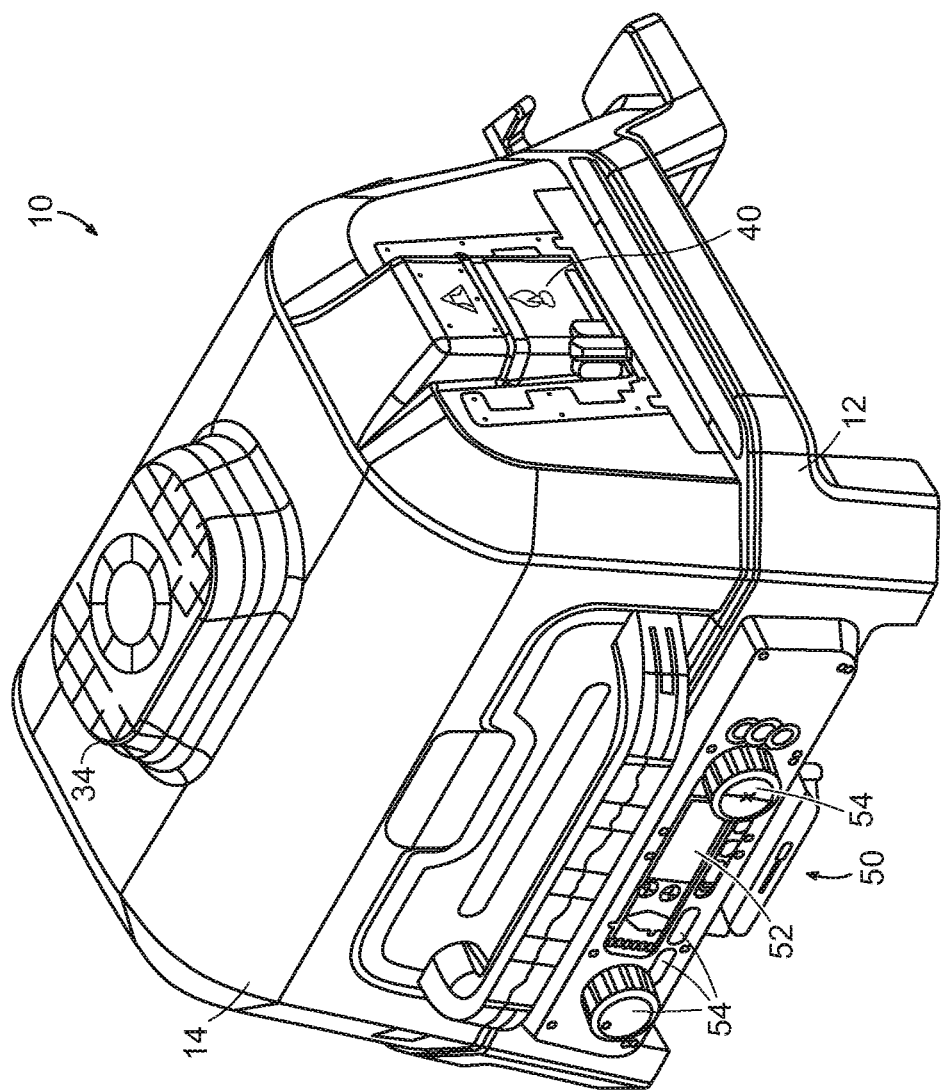
FIG. 1 is a front perspective view of a cooking device according to an embodiment.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings, and additional examples of specific system structures, functions, manufactures, uses, and related methods can be found in U.S. application Ser. No. 17/733,237, which is incorporated by reference herein in its entirety Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, cooking devices including a smoke channel linking a smoke unit and a cooking chamber are provided. In some embodiments, the cooking device can include a housing having a base and a movable lid or door coupled to the base that together define an interior cooking chamber. A fan can be disposed within the interior chamber, and a smoke unit can be coupled to the cooking device (e.g., coupled to the lid, the door, the housing, etc.). The smoke unit can contain a pellet box that can be configured to hold a fuel source (e.g., pellets, wood chips, etc.) and to ignite the fuel source to generate smoke used to flavor a food product contained within the cooking device. The smoke unit may include a pellet box holder that can pivot away from the cooking device to provide access to the pellet box such that the pellet box can be removed from within the smoke unit. In some variations, the entire smoke unit itself can be removable. A smoke channel can run from the smoke unit to the fan, or areas proximate to the smoke unit and to the fan, such that in operation when the fan is powered on, a low-pressure zone created by the fan can draw smoke generated by the smoke unit, through the smoke channel, into the interior cooking chamber. The smoke can impart smoke flavors onto the food product disposed within the interior cooking chamber during a cooking process or during a separate, smoking process. The smoke channel can have a variety of configurations or forms, and can be positioned in a variety of locations relative to the smoke unit and/or the fan.

Figure 2:
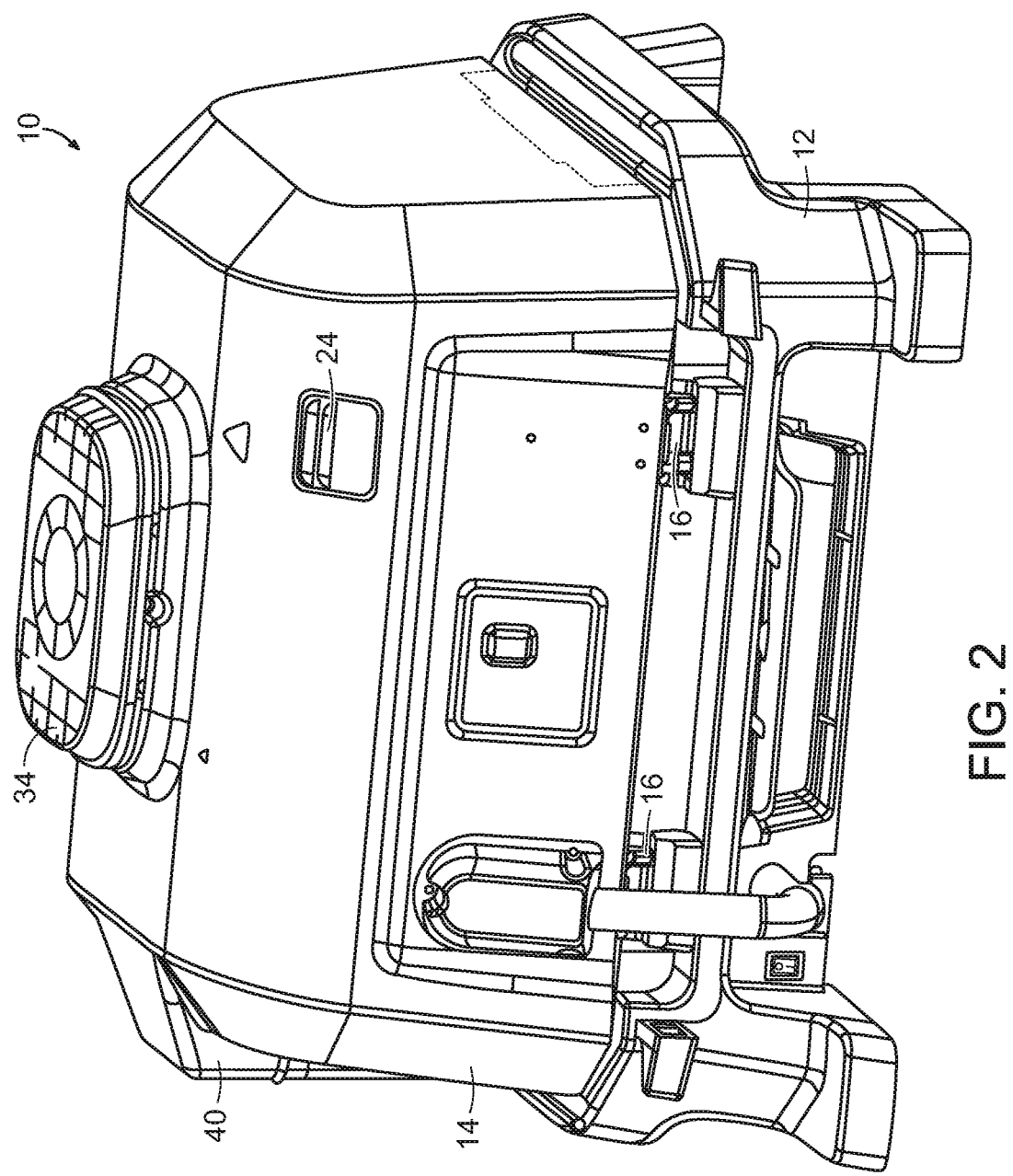
FIG. 2 is a rear perspective view of the cooking device of FIG. 1.
Figure 3:
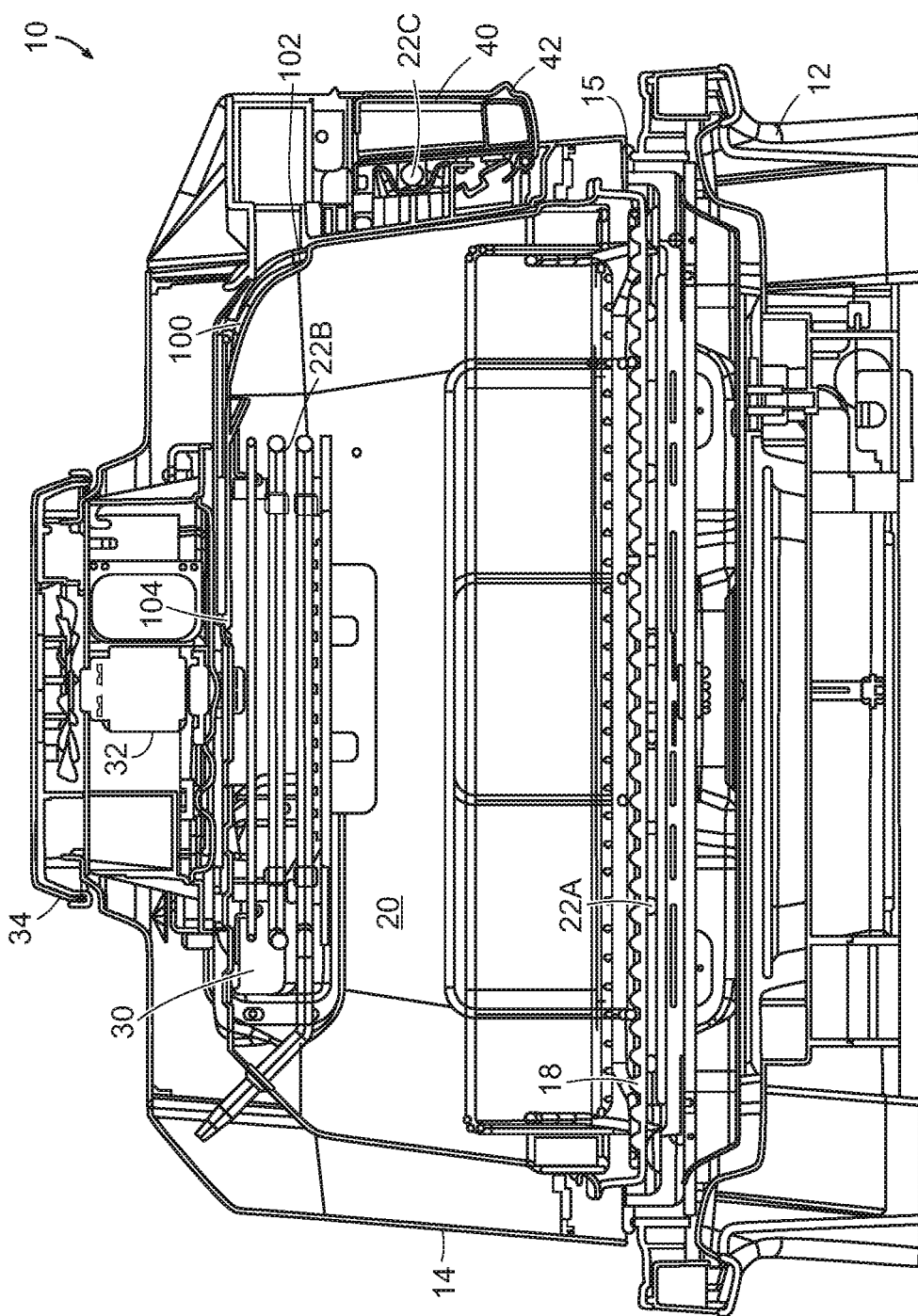
FIG. 3 is a cross-sectional view of the cooking device of FIG. 1.

FIGS. 1-3 illustrate a cooking device 10 including a smoke channel 100 according to an embodiment. The cooking device 10 can be used to cook food in a variety of cooking modes, including conductive and convective modes (e.g., sauté, grill, bake, air fry, dehydrate, roast, broil, etc.). The illustrated cooking device 10 includes a base 12 and a lid 14 movably coupled to the base 12, such as via a hinge 16. Together, the base 12 and the lid 14 can be referred to generally as a housing and can define an interior cooking chamber 20 that is sized to receive a variety of food products and/or food containers (e.g., a baking tray, a rack, etc.). A seal 15 can be located at a perimeter of the base 12 and/or the lid 14 to assist in sealing the interior cooking chamber 20 at the point of connection between the base 12 and the lid 14 when the lid 14 is in a closed position. The seal 15 can generally operate like a gasket and can be any material capable of operating as a seal, as would be known by a person skilled in the art. For example, the seal 15 can be rubber, plastic, fiberglass, metal, or any other material.

The base 12 can include a cooking surface 18 upon which a food product can be placed during an operating procedure of the cooking device 10. Although the cooking surface 18 is depicted as a grill or griddle surface in FIG. 3, the cooking surface could also take the form of a wire rack or other type of platform. The cooking device 10 can include at least one heating element disposed in the lid 12, the base 14, and/or the interior cooking chamber 20 that is configured to heat the cooking surface 18, the interior cooking chamber 20 and/or the food product through conduction, convection, radiation, or a combination thereof. In some variations, the cooking device 10 can include a first heating element 22A disposed beneath the cooking surface 18 and a second heating element 22B disposed in the lid 14. The cooking device 10 can also include at least one vent 24 located within the lid 14 and/or the base 12 to allow airflow to exit the interior cooking chamber 20. The vent 24 can be seen at least in FIG. 2 located on a rear of the cooking device 10. As a result of the seal 15 located around a perimeter of the base 12 and/or the lid 14, the vent 24 can be the primary (or the only) airflow exit for the interior cooking chamber 20. Accordingly, the size of the vent 24 can proportionally drive airflow through the cooking device 10, as will be described in greater detail below.

The cooking device 10 can also include a fan 30, which can be operated to circulate air within the interior cooking chamber 20 during a variety of cooking modes. The fan 30 can be located within the interior cooking chamber 20, and can be coupled to the lid 14, the base 12, or any other portion of the cooking device 10. For example, as seen at least in FIGS. 1-3, the fan 30 can be located on an upper region of the interior cooking chamber 20 and can be configured to rotate about a vertical axis. A motor 32 capable of driving the fan 30 can be located within a motor housing 34 externally of the interior cooking chamber 20. In some variations, the fan 30 can be located external to the interior cooking chamber 20 and can be in fluid communication with the interior cooking chamber 20 through an air pathway, such as a ventilation system or the like.

The cooking device 10 can also employ a smoke unit 40 coupled to the cooking device 10 to impart smoke flavor onto a food product in any mode. The smoke unit 40 can be removably coupled internally or externally to the cooking device 10, such as to the base 12, the lid 14, or anywhere else on the cooking device. The smoke unit 40 can receive a fuel source, such as wood pellets, and can ignite the pellets using a heating element 22C to generate smoke to impart flavor onto a food product contained within the interior cooking chamber. The generation of smoke can occur during a cooking mode to impart smoke flavors. Further, the cooking device 10 can employ the smoke unit 40 independent of a cooking mode in order to impart smoke flavor to a food product without cooking the food product. The smoke unit 40 can also include an intake 42 located on an exterior thereof, which can provide the cooking device 10 with a source of new air to feed a smoke generation process and allow for air to circulate within the interior cooking chamber 20. The intake 42 can be intentionally and deliberately sized to correspond to a size of the vent(s) 24 located on the lid 14 and/or the base 12 of the cooking device such that the amount of airflow exiting the interior hollow chamber is approximately equal to the amount of airflow entering the intake 42.

The cooking device can include a user interface 50 located on an external portion of the cooking device 10, such as on a front face of the base 12, as seen, for example, in FIG. 1. The user interface 50 can include a screen 52 and a variety of inputs 54 with which a user can select various parameters for a cooking and/or a smoke process for a food product. The user interface 50 can include a variety of pre-programmed operating modes. These cooking modes can include conductive, convective, and radiative heating modes, such as grilling, baking, air frying, dehydrating, broiling, and other known cooking modes. Further, these cooking modes can combined with smoke generated by the smoke unit 40. Smoke can be introduced from the smoke unit, and can include low-and-slow modes to impart smoke over a longer period of time and perfume smoke to impart smoke flavor over a short period of time. Further, smoke can be imparted onto a food product independent of a cooking mode, such that the food product may be imparted with smoke flavor without being cooked. Any of the listed operations can be used in combination with one another, both in succession or at the same time.

The cooking device 10 can also employ a smoke channel to introduce smoke generated by the smoke unit into the interior cooking chamber. The smoke channel can provide a pathway through which generated smoke can be drawn, by operation of the fan, into the interior cooking chamber in order to impart smoke flavor onto a food product. Further, the smoke channel can also form part of an airflow pathway that begins with the intake 42 of the smoke unit 40 and ends with the vent(s) 24. The smoke channel can come in a variety of forms, as will be discussed below.

Figure 4:
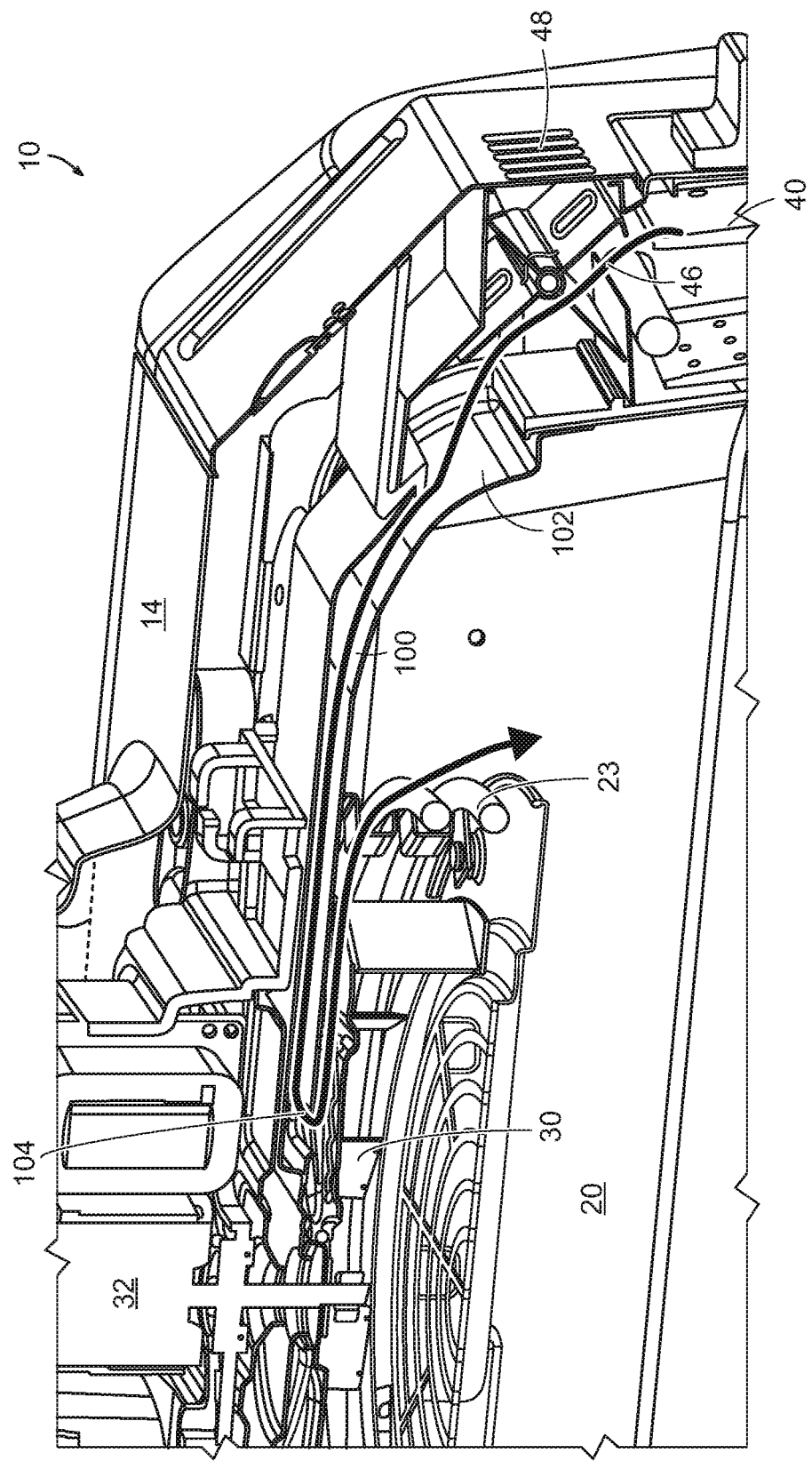
FIG. 4 is a partial cross-sectional view of the cooking device of FIG. 1 showing an embodiment of a smoke channel.

FIGS. 3-5 depict a smoke channel 100 according to a first embodiment. The smoke channel 100 can take the form of an offset ceiling smoke channel 100 that fluidly links the interior of the smoke unit 40 with the interior cooking chamber 20. The smoke channel 100 can be at least partially defined by a portion of the cooking device 10, such as by a portion of the lid 14, as seen in the cross-sectional view of FIG. 4. In this way, the smoke channel 100 can follow a contour of the interior cooking chamber 20, while remaining located almost entirely within the overall form of the cooking device 10. For example, the smoke channel 100 can extend along about a quarter of the interior cooking chamber 20 and can have a length greater than a height of the smoke unit 40. The smoke channel 100 can further extend across a corner or an edge of the lid 14 so that it is located on two or more interior walls of the interior cooking chamber 20. A first end 102 of the smoke channel 100 can be located proximate to the smoke unit 40, external to the interior cooking chamber 20 but within the confines of the cooking device 10 and generally on a side of the lid 14, while a second end 104 of the smoke channel 100 can be located within the interior cooking chamber 20 proximate to the fan 30 and generally on a top of the lid 14. The size and location of the second end 104 of the smoke channel 100 can greatly effect the total draw of smoke from the smoke unit 40 into the interior cooking chamber 20, as will be explained in greater detail below.

Figure 5A:
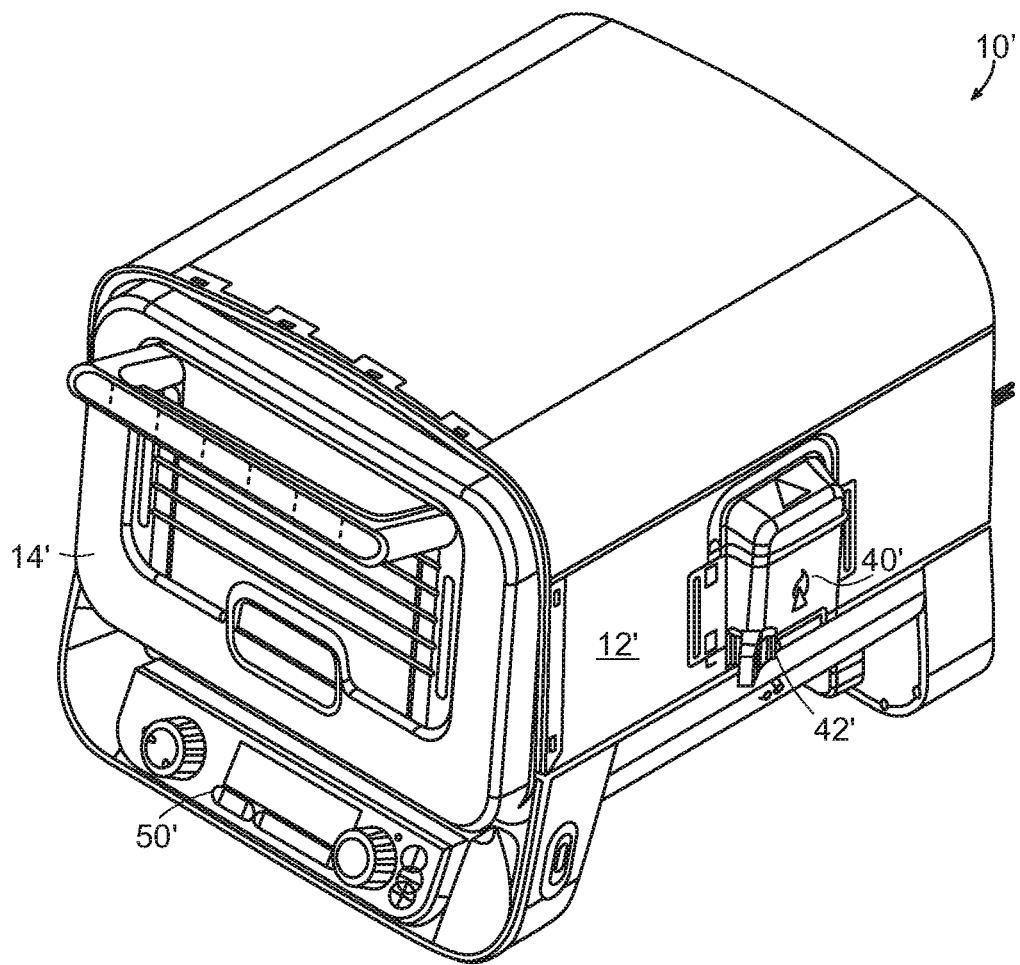
FIG. 5A is a perspective view of another embodiment of a cooking device having the smoke channel of FIG. 4.
Figure 5B:
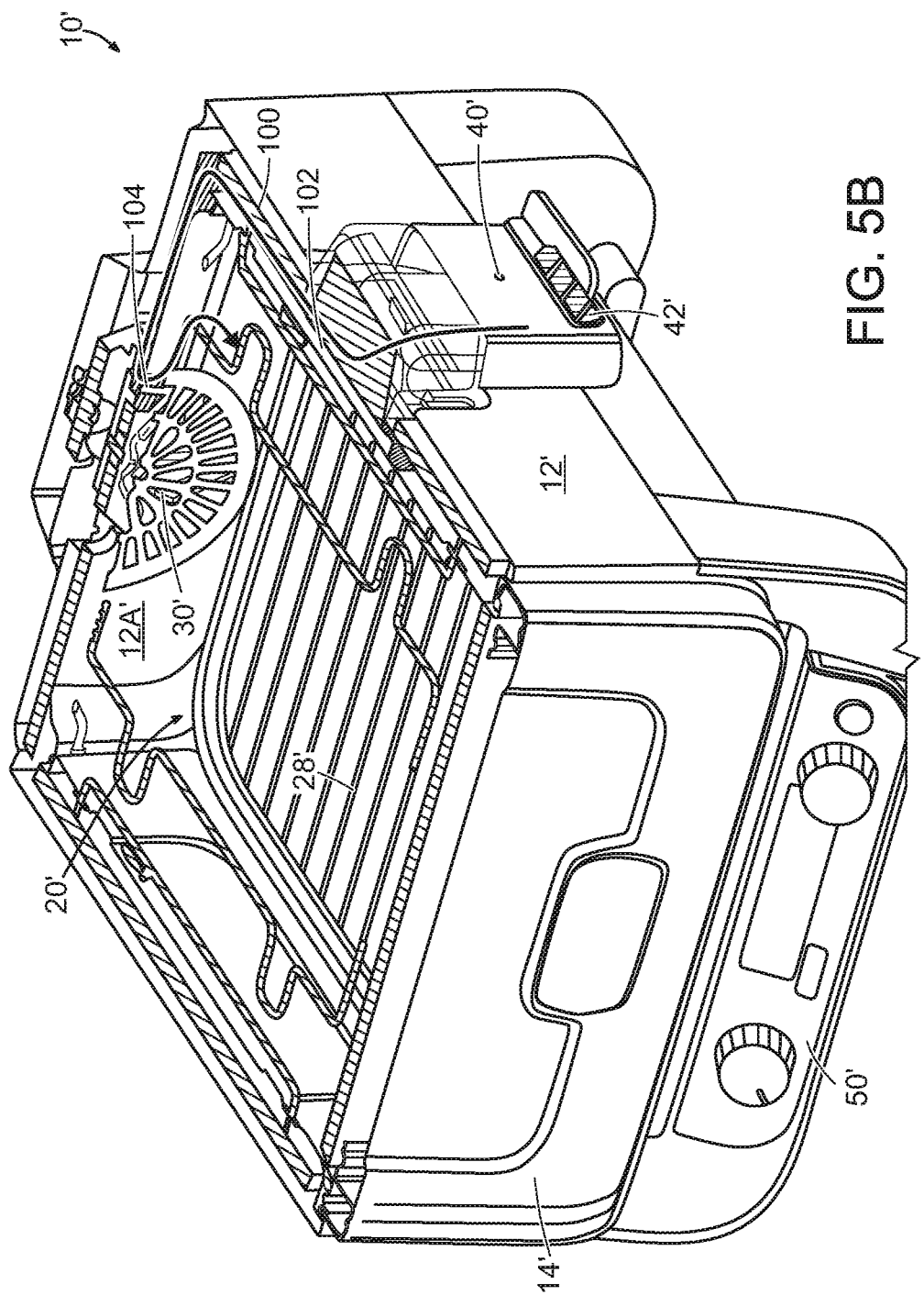
FIG. 5B is a cross-sectional view of the cooking device of FIG. 5A.

FIGS. 5A and 5B depict the smoke channel 100 in a different arrangement on another embodiment of a cooking device 10'. The illustrated cooking device 10' can be generally similar to cooking device 10, and for brevity, similar components will not be described again. For example, the cooking device 10' can generally include a housing 12', a smoke unit 40', a fan 30', and a user interface 50'. However, in this embodiment the cooking device 10' includes a movable door 14' that can be pivoted open on the front of the cooking device. Further, an exemplary difference between the cooking device 10' and the cooking device 10 is the location of the fan 30' on the cooking device 10'. As shown in FIG. 5B, the fan 30' is located on a rear wall 12A' of the interior cooking chamber 20', rather than on a ceiling or upper region of the interior cooking chamber 20'. Generally, the fan 30' can be located on a wall of the interior cooking chamber 20' opposite the front and the door 14'. In this arrangement, the fan 30' can rotate about a horizontal axis, but the fan 30' generally operates in a similar manner as the fan 30. The smoke channel 100 can be seen in the right side of the housing 12', and the smoke channel 100 can be at least partially defined by the housing 12', similar to the form of the smoke channel 100. The smoke channel 100 can lead from the smoke unit 40' at a first end 102 thereof to the fan 30' at a second end 104 thereof. Despite the difference in arrangement between the cooking device 10 and the cooking device 10', the principal of operation of the smoke channel 100 is generally the same in each device. Accordingly, although reference is made herein to the cooking device 10, descriptions are equally applicable to the cooking device 10'.

Figure 6:
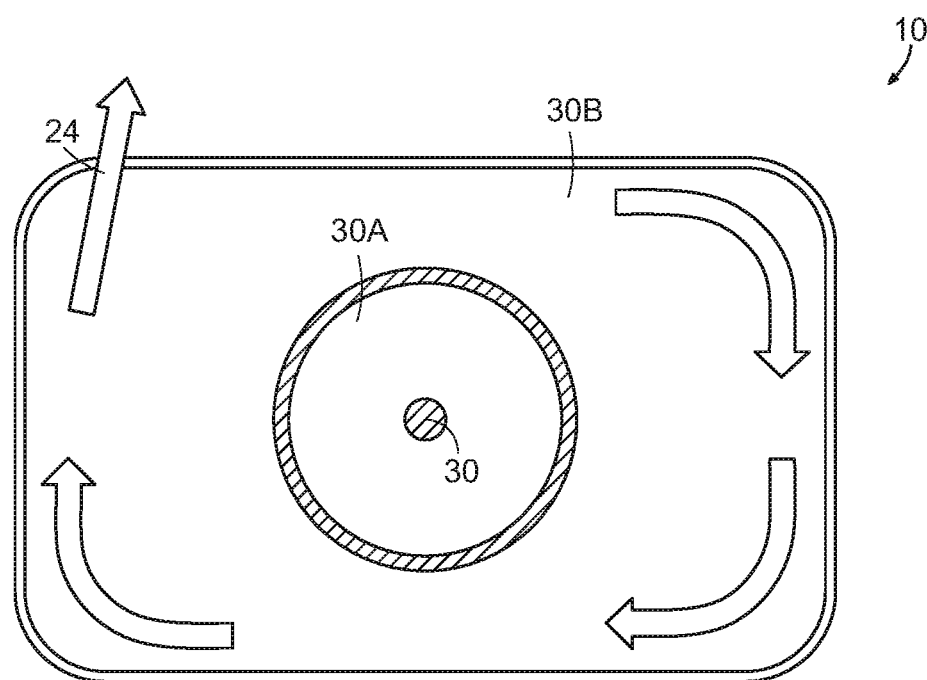
FIG. 6 is a simplified top view of the cooking device of FIG. 1.
Figure 7:
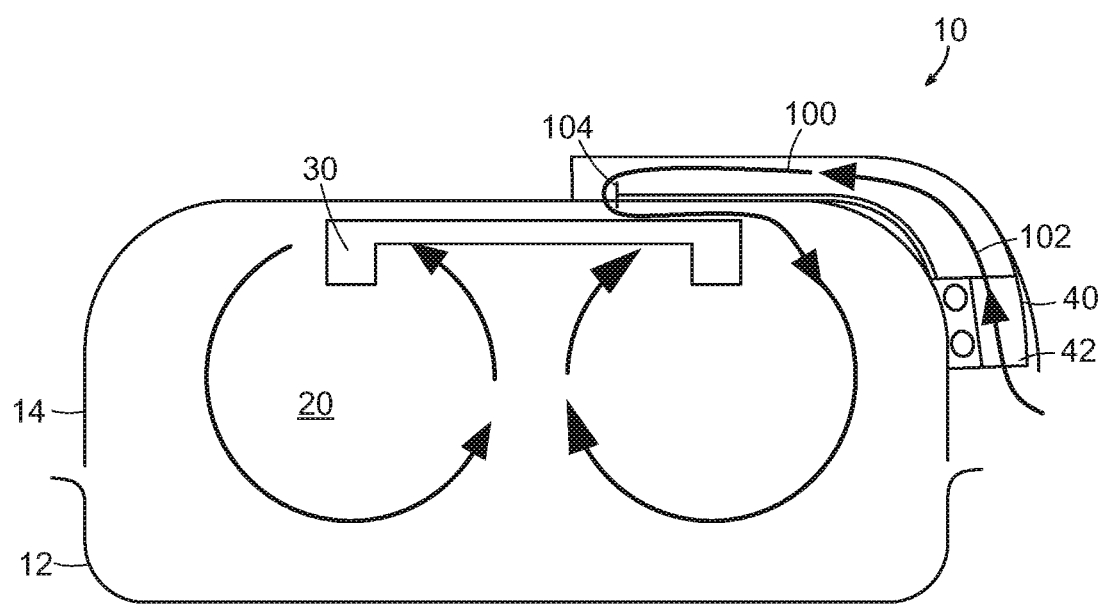
FIG. 7 is a simplified side view of the cooking device of FIG. 1 showing the smoke channel of FIG. 4.

FIGS. 6-7 relate to operation of the cooking device 10 with the smoke channel 100 and the way in which air and smoke flow through the cooking device 10. Operation of the fan 30 within the interior cooking chamber 20 can result in the creation of two general zones of airflow, which can be seen in a top-down view of a simplified cooking system (e.g., cooking device 10) in FIG. 6. The first airflow zone 30A can be located proximate the fan 30 and can be sized to correspond generally to an overall diameter of the fan 30. This first airflow zone 30A includes a near-constant low-pressure zone created by operation of the fan 30, and the first airflow zone 30A can include the direct draw of the fan, which can directly correlate to the rotations-per-minute (RPM) of the motor 32 driving the fan 30. The first airflow zone 30A can have minimal turbulent airflow passing therethrough.

The second airflow zone 30B can be located outward of the first airflow zone 30A and can occupy the remaining portion of the interior cooking chamber 20. The second airflow zone 30B includes the bulk airflow around the perimeter of the interior cooking chamber 20 created by the fan 30. The airflow within the second airflow zone 30B can be heavily influenced by the presence of elements of the cooking device, including the vent(s) 24, the smoke channel 100, and other features. Therefore, while the second end 104 of the smoke channel 100 can be located anywhere within the interior cooking chamber 20, placement of the second end 104 of the smoke channel 100 within the first airflow zone 30A proximate the fan 30 can result in a more robust smoke draw through the smoke channel 100 as facilitated by the near-constant low pressure zone present within the first airflow zone 30A. Additionally, this placement of the second end 104 within the first airflow zone 30A minimizes the impact of an additional element within the second airflow zone 30B, which could detrimentally affect the overall smoke draw through the cooking device. Although the smoke draw on the smoke channel 100 with a second end 104 located within the second airflow zone 30B can be effective, smoke drawn through the smoke channel 100 can be relatively interrupted as a result of the influence of the elements of the cooking device, as introduced above.

From a side perspective, as seen in FIG. 7 featuring the fan 30, the smoke unit 40, and the smoke channel 100 as they are positioned relative to the cooking device 10, operation of the fan 30 can act to circulate air throughout the interior cooking chamber 20 in a toroidal pattern. Air can flow into the smoke unit 40 via the intake 42, gathering smoke generated by the smoke unit 40, and then the air and smoke can flow through the smoke channel 100 and into the interior cooking chamber 20. Once the air and smoke enter the interior cooking chamber 20 via the second end 104 of the smoke channel 100, the air and smoke can flow through the interior cooking chamber in a downward direction near the perimeter and in an upward direction near the center. The already-introduced air and smoke can be circulated in this manner as well. Further, because the smoke channel 100 is at least partially defined by the lid 14 to have a minimal form factor, the air in the chamber can circulate unimpeded by elements of the cooking device jutting into the interior cooking chamber 20. Smoke and air can leave the interior cooking chamber 20 via the vent(s) 24. In some variations, however, the direction of flow can be reversed, such that air flows downward toward the center of the interior cooking chamber 20 and upward at a perimeter of the interior cooking chamber 20.

Figure 8:
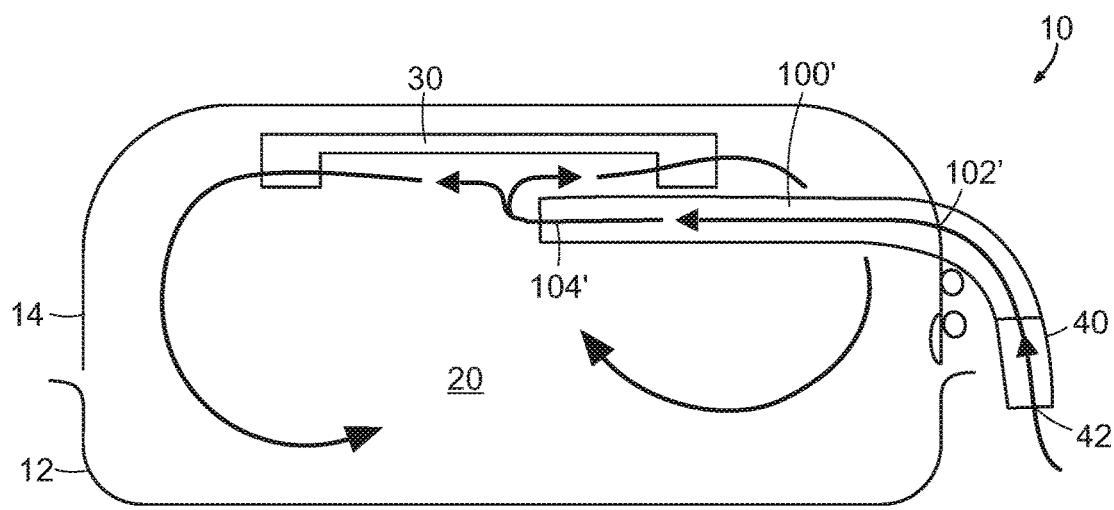
FIG. 8 is a simplified side view of the cooking device of FIG. 1 with a smoke channel according to another embodiment.
Figure 9:
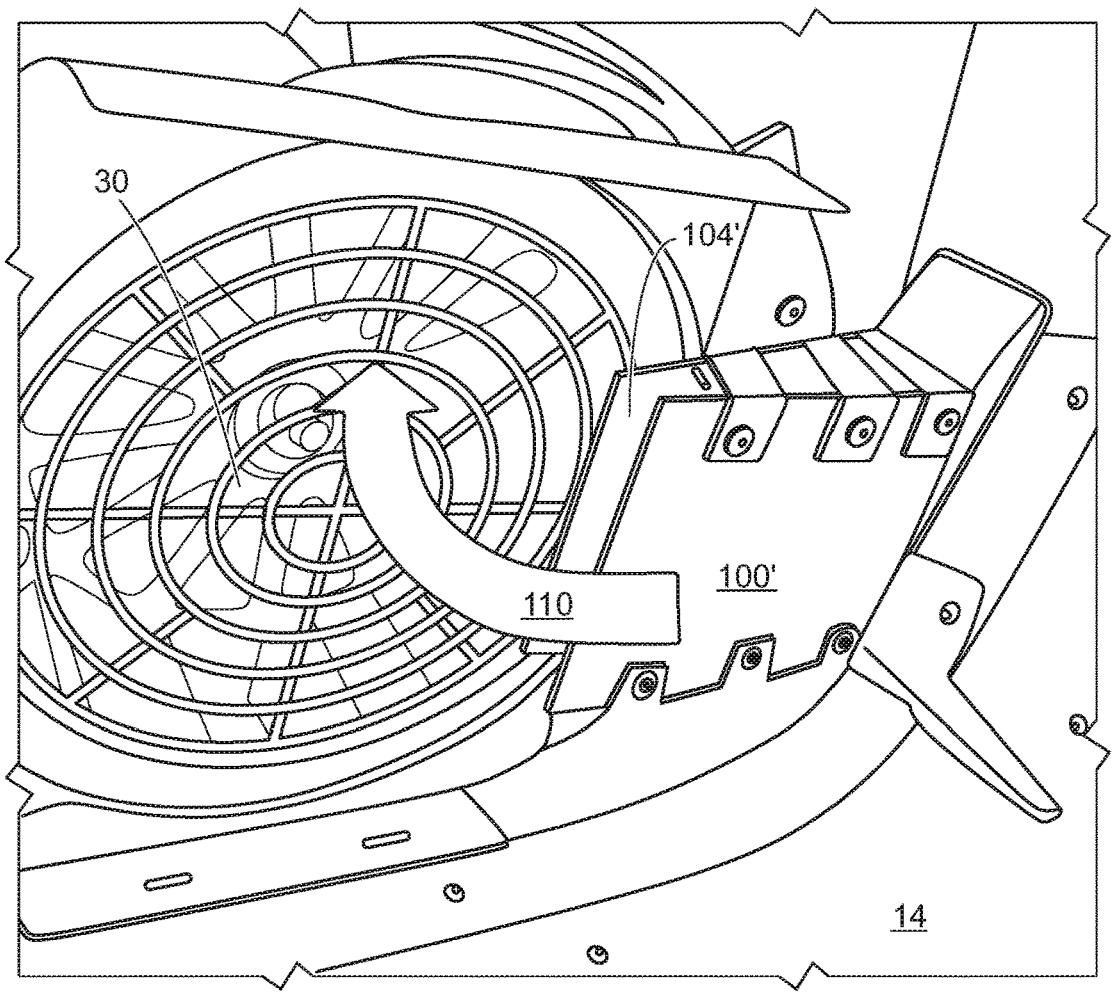
FIG. 9 is a partial perspective view of the smoke channel of FIG. 8.
Figure 10:
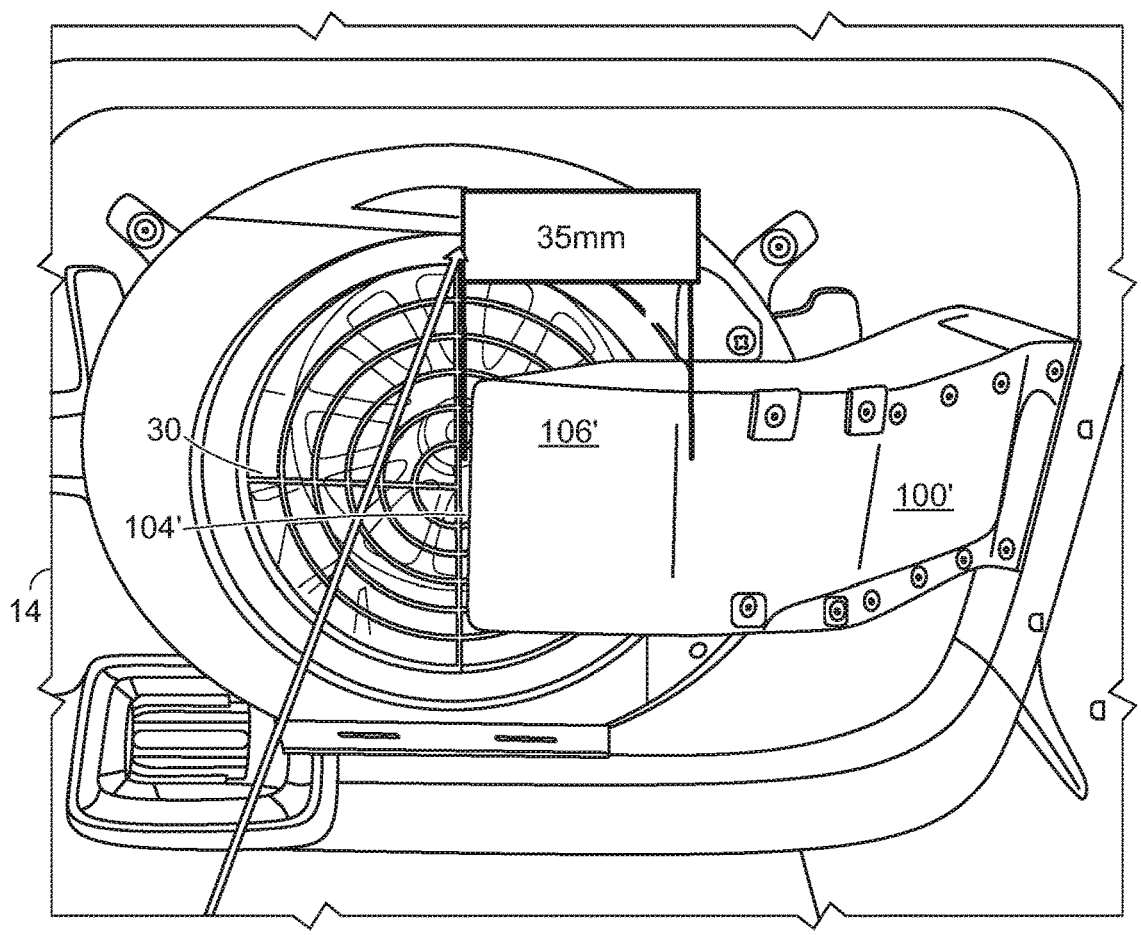
FIG. 10 is a partial perspective view of the smoke channel of FIG. 8 with an extension.

FIGS. 8-10 depict a smoke channel 100' usable with any of the cooking systems described herein, for example the cooking device 10, according to another embodiment. The smoke channel 100' can take the form of a duct extending directly from the smoke unit 40 at a first end 102' to a position proximate the fan 30 at a second end 104'. In contrast with the smoke channel 100, the second end 104' can be positioned beneath the fan 30 such that smoke entering the interior cooking chamber is initially drawn upward and then circulated around the perimeter in a manner shown in FIG. 8. Further, the smoke channel 100' can be arranged such it extends toward the fan 30 independent of the curvature of the interior cooking chamber 20. As a result, in operation of the cooking device 10, airflow around the interior cooking chamber can flow around the smoke channel 100' in a toroidal pattern with smoke flowing upward in a center portion of the interior cooking chamber 20 and downward at a perimeter of the interior cooking chamber 20. As explained above, this flow direction can be reversed.

FIG. 9 depicts the smoke channel 100' extending near the fan 40 with an airflow path 110 shown entering the fan 30 from the second end 104'. The second end 104' can be seen ending near a peripheral region of the fan 30. FIG. 10 depicts the smoke channel 100' having an extension 106' attached to extend the second end 104' closer to a center region of the fan 30. Depending on the draw desired, the exact position of the second end 104' of the smoke channel 100' can be moved to either increase or decrease an overall draw of smoke. In some variations, the length and/or position of the smoke channel 100' can be adjusted by a user in order to achieve a desired draw of smoke therethrough. The manipulation of the smoke channel position can be applied to any embodiment described herein and will be described in further detail below.

Figure 11:
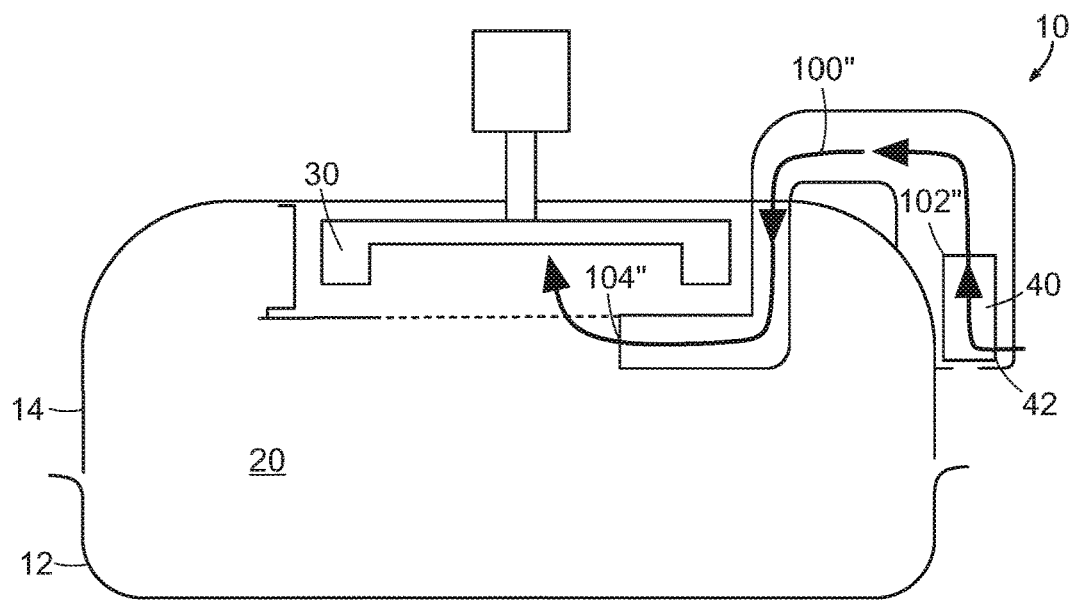
FIG. 11 is a simplified side view of the cooking device of FIG. 1 with a smoke channel according to another embodiment.
Figure 12:
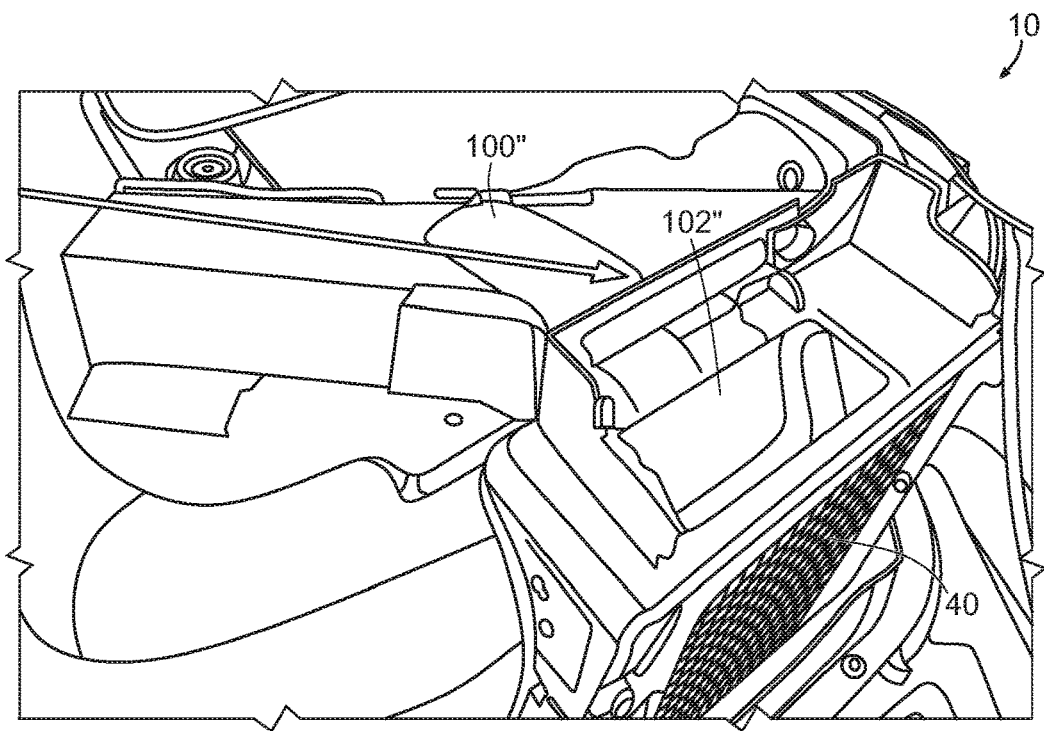
FIG. 12 is a partial perspective view of the smoke channel of the FIG. 11 as viewed from an exterior of the smoke device.
Figure 13:
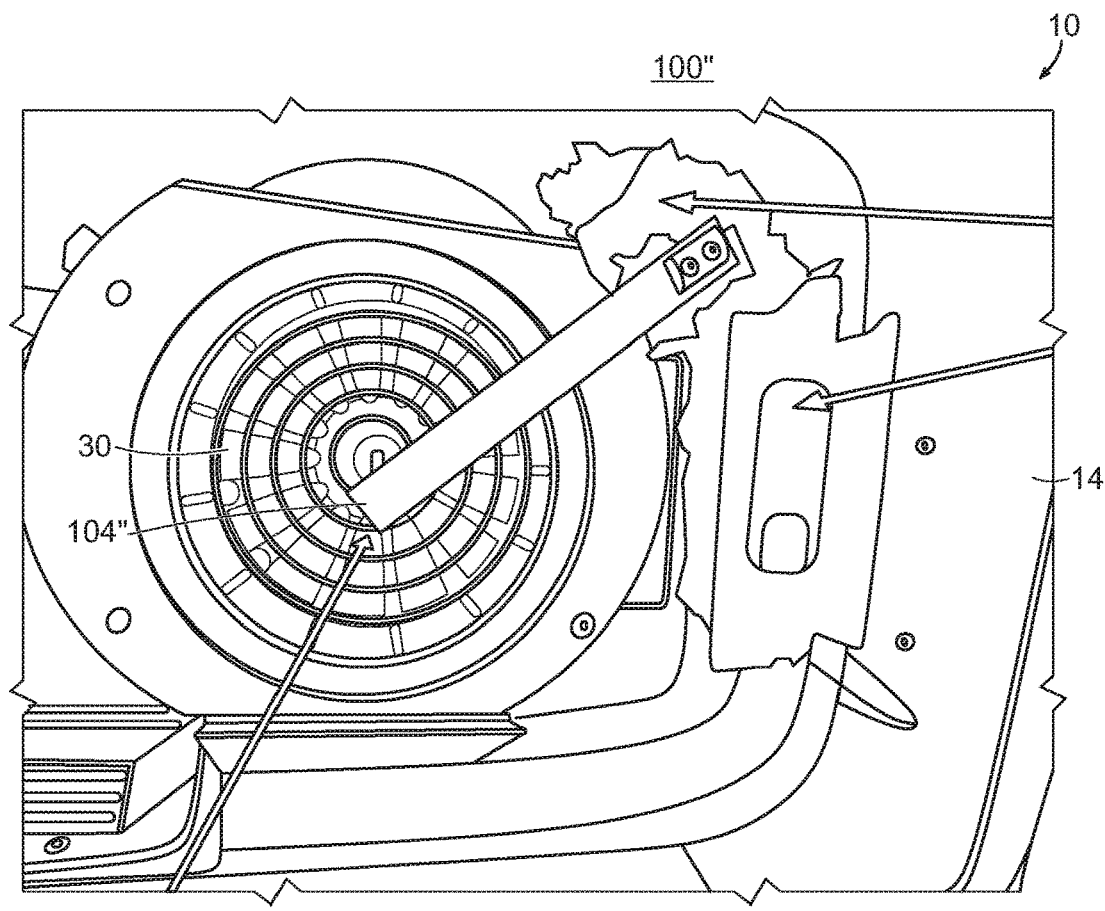
FIG. 13 is a partial perspective view of the smoke channel of FIG. 11 as viewed from an interior of the smoke device.

FIGS. 11-13 depict a smoke channel 100", also usable with any of the cooking systems described herein, according to another embodiment. The smoke channel 100" can take the form a duct, similar to the smoke channel 100', but the smoke channel 100" can have a smaller profile, resulting in less disruption to airflow within the interior cooking chamber 20. Instead of extending directly from the smoke unit 40 at a first end 102" to the fan 30 at a second end 104", the smoke channel can turn upward and drop in from a top portion of the interior cooking chamber 20 directly next to the fan 30. This arrangement can be seen especially in FIGS. 11 and 12, where only about half of the smoke channel 100" is actually located within the interior cooking chamber. In FIG. 12, a gap is shown between the first end 102" and the smoke unit 40, which would not be present in an operating system. Further, the smoke channel 100" can have a smaller profile overall, especially when compared to the smoke channel 100'. Not only is a large portion of the smoke channel 100" located outside of the interior cooking chamber 20, but the smoke channel 100" is narrower in height and width and occupies a smaller volume of space within the interior cooking chamber 20. This can result in improved airflow within the interior cooking chamber 20 when compared to the smoke channel 100'.

Some variations of the smoke channels described herein can include means by which a volume of smoke moving through the smoke channel is variable. Description will be made with reference to the smoke channel 100, but the details are applicable universally. These means for variable smoke can vary and may generally include a side vent and a way in which smoke generated by the smoke unit can be diverted out of the smoke channel 100 through the side vent so that the smoke does not flow into the interior cooking chamber 20. Other designs may rely on tamping the rate of combustion of the fuel source within the smoke unit, such as by decreasing an availability of oxygen, by decreasing an amount of fuel contained within the smoke unit, or by decreasing ventilation within the smoke channel 100 such as by closing off a side vent 48.

The cooking device 10 can include elements with which an amount of smoke generated by the smoke unit 40 can be varied, or with which an amount of generated smoke entering the interior cooking chamber 20 can be varied. One example of such a variable smoke system can be a baffle. Turning back to FIG. 4, a baffle 46 is positioned proximate the first end 102 of the smoke channel 100 and just above the smoke unit 40 next to the side vent 48. The baffle 46 can be actuated to rotate and block off access to the smoke channel 100 while simultaneously providing access to the side vent 48. In this way, a new airflow path can be created. The baffle 46 can be electronically and/or manually actuated, such as by a sensor (not pictured) coupled to the smoke unit and configured to detect a time, a temperature, or another parameter of the smoke unit, or by an input on the user interface 50, for example. The baffle 46 can be manually actuated such as by rotation, toggle, or a slide maneuver to cause the baffle 46 to alter a position and to block an airflow path from the smoke unit 40 into the smoke channel 100. Air can enter the intake 42 and smoke can be generated by the smoke unit 40, but instead of being drawn into the interior cooking chamber 20, the baffle 46 blocks that flow path and the natural current of the smoke carries the smoke out through the side vent 48. When smoke is needed in the chamber, the baffle 46 can rotate or generally actuate to block off the side vent 48 and provide access to the smoke channel 100 to allow smoke generated by the smoke unit 40 to flow into the interior cooking chamber 20. The cooking device 10, as well as any other cooking device described herein, can have other variable smoke systems, which will be described in greater detail below.

The cooking devices described herein can have various elements which can impact the overall draw and circulation of air and smoke within the systems in which they appear. These elements can increase, decrease, or have minimal impact on this draw. FIGS. 14-21 depict various features and charts showcasing the relationship between variable of cooking systems, which can be implemented to any of the cooking systems described herein.

Figure 14:
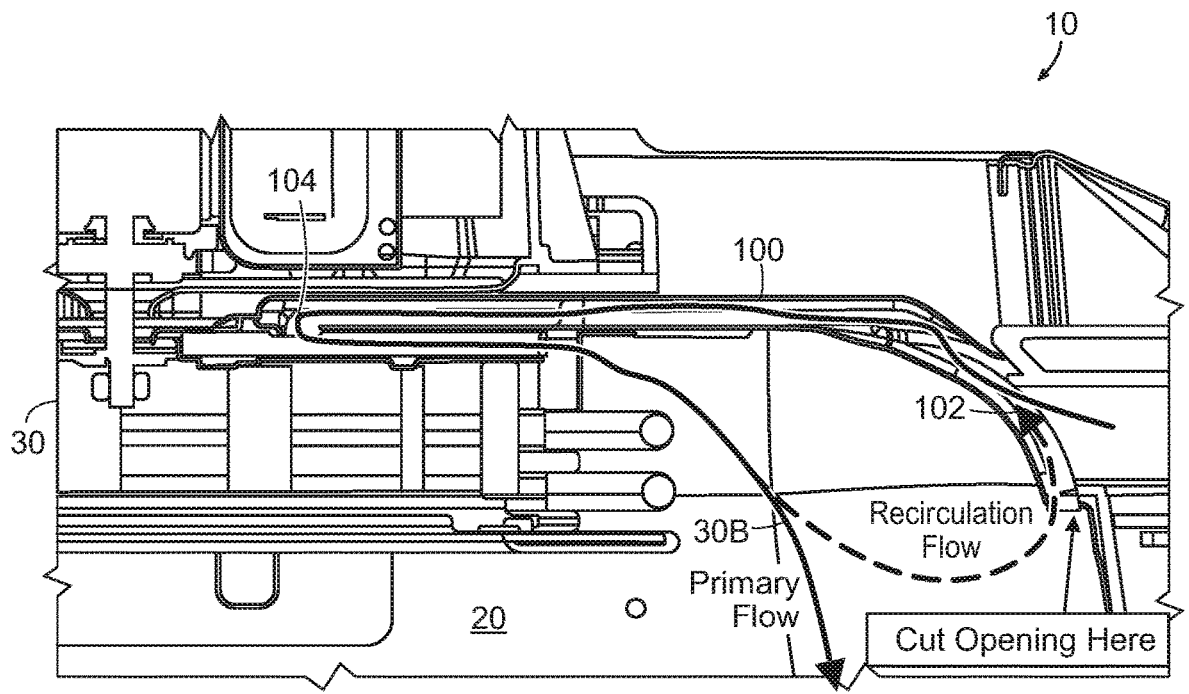
FIG. 14 is a partial cross-sectional view of the smoke channel of FIG. 8 with a recirculation opening.

Some variations of the smoke channel 100 can include the addition of a recirculation opening 108 located within the smoke channel 100 between the first end 102 and the second end 104, as seen in FIG. 14. The recirculation opening 108 can be located within either the first or second airflow zones 30A, 30B, and FIG. 14 depicts the recirculation opening 108 within the second airflow zone 30B. In variations featuring the recirculation opening 108, some air flowing through the interior cooking chamber can flow into the smoke channel 100 via the recirculation opening 108 and be outputted at the second end 104 proximate the fan 30. This can result in an overall reduced draw of smoke from the smoke unit 40 for a given motor 32 speed. When the size of the recirculation opening is increased, the draw of smoke from the smoke unit 40 can be reduced even further.

Figure 15:
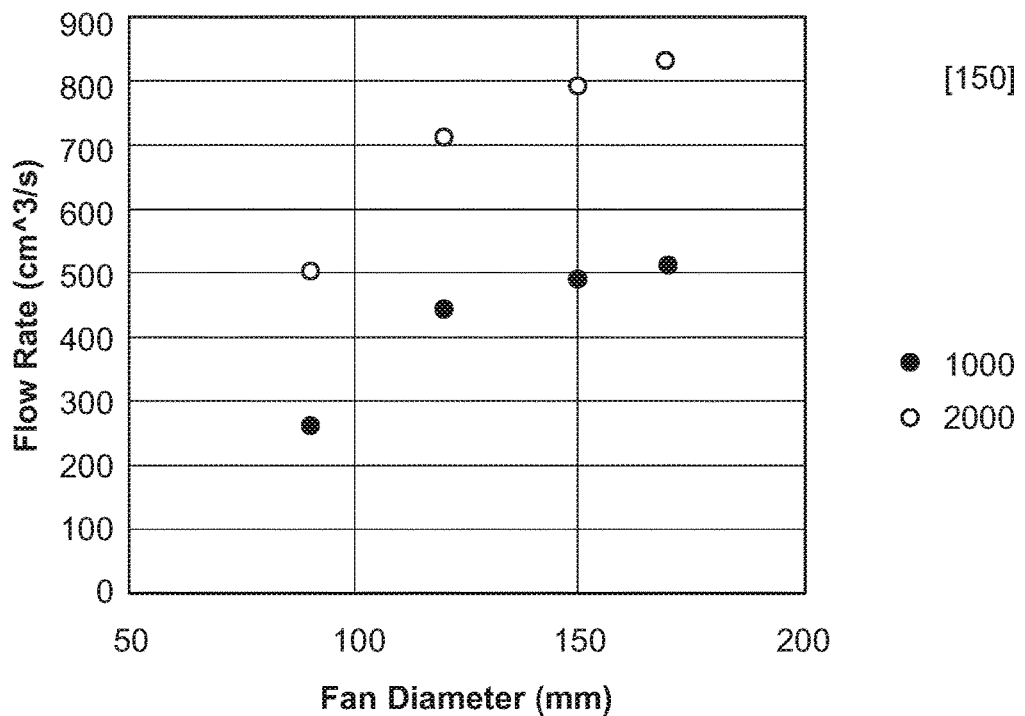
FIG. 15 is a plot detailing a relationship between fan diameter and flow rate through a smoke channel.

FIG. 15 depicts a plot 150 of flow rate as a function of fan 30 diameter at varying RPMs. The x-axis measures fan diameter (mm) and the y-axis measures flow rate (cm³/s). The data is as follows:

| Approximate Fan Diameter (mm) | Approximate Flow Rate for 1000 RPM (cm³/s) | Approximate Flow Rate for 2000 RPM (cm³/s) |
| --- | --- | --- |
| 90 | 260 | 500 |
| 120 | 440 | 720 |
| 150 | 490 | 790 |
| 170 | 520 | 830 |

Figure 16:
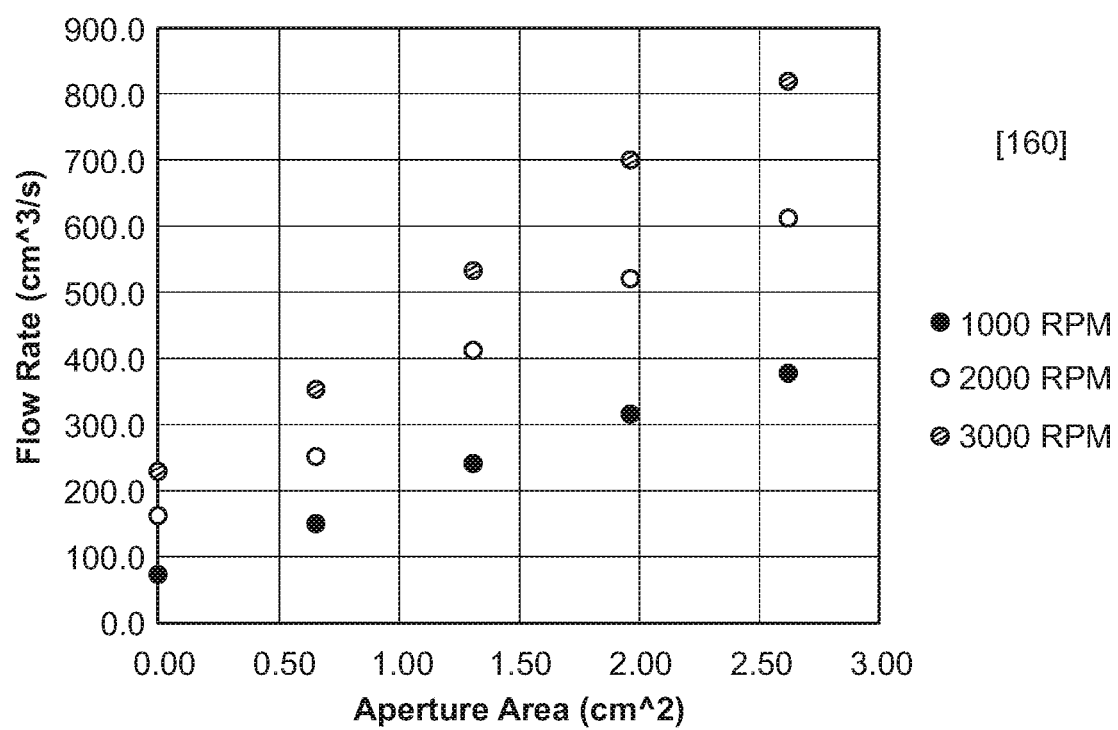
FIG. 16 is a plot detailing a relationship between an area of a smoke channel aperture and draw through the smoke channel.

FIG. 16 depicts a plot 160 of the aperture size (cm²) of the second end of a smoke channel versus flow rate (cm³/s) through the smoke channel at 1000, 2000, and 3000 RPM. Generally, at each of the motor speeds, as the aperture area increases, the flow rate increases. The effect is more dramatic the higher the motor speed. The data is as follows:

| Aperture Area (cm²) | Approximate Flow Rate for 1000 RPM (cm³/s) | Approximate Flow Rate for 2000 RPM (cm³/s) | Approximate Flow Rate for 3000 RPM (cm³/s) |
| --- | --- | --- | --- |
| 0.0 | 80 | 160 | 230 |
| 0.60 | 150 | 250 | 360 |
| 1.40 | 240 | 410 | 540 |
| 1.90 | 310 | 510 | 690 |
| 2.60 | 380 | 610 | 820 |

Figure 17:
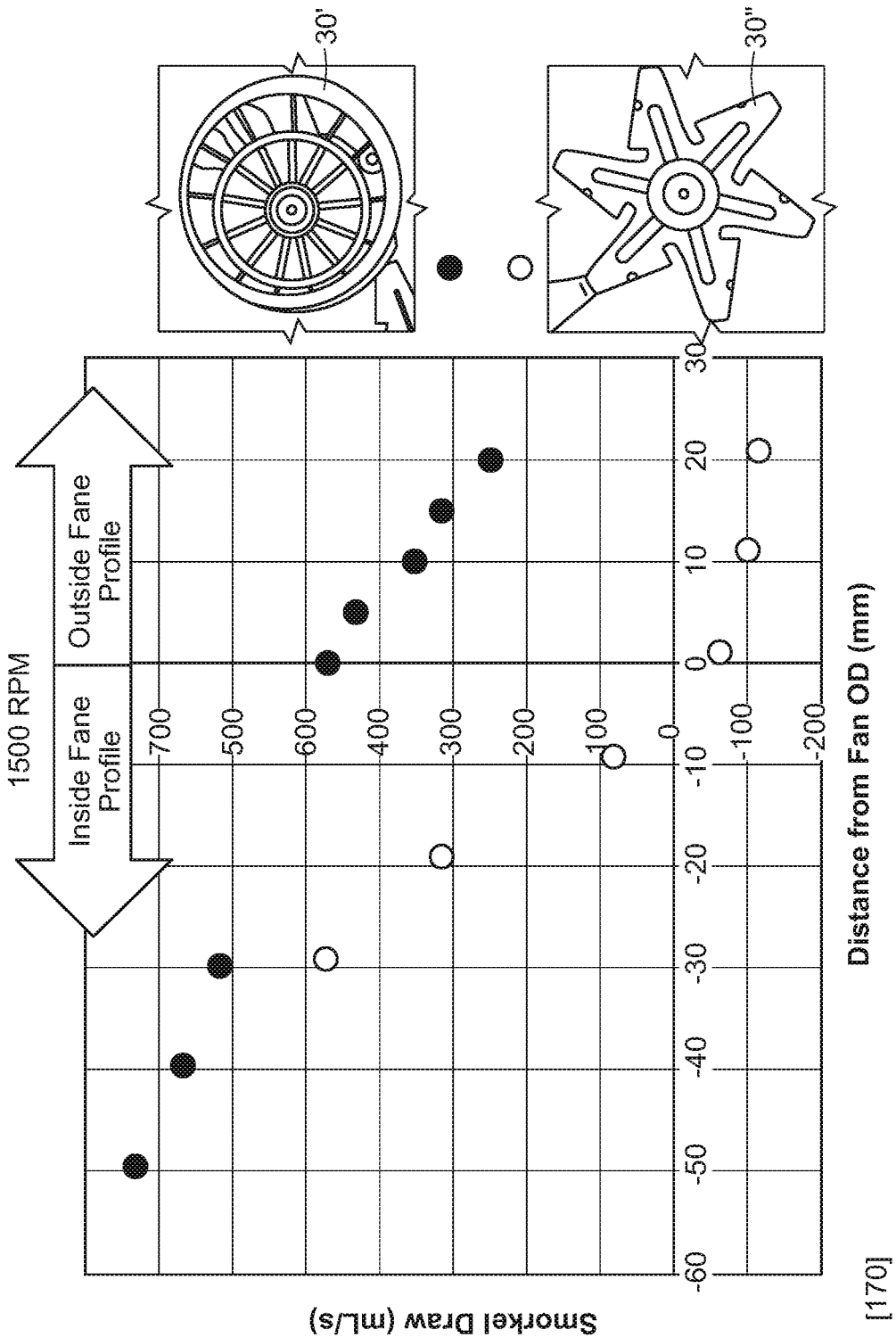
FIG. 17 is a plot detailing a relationship between smoke channel distance from an outer diameter of a fan and draw through the smoke channel.

FIG. 17 depicts a plot 170 of a relationship between distance of a second end of a smoke channel from an outer diameter of a fan (mm) versus flow rate (mL/s) for two different kinds of fans, an impeller design 30' and a bladed fan design 30", at 1500 RPM. Generally, as the second end of a smoke channel is positioned further from the fan axis, flow rate through the smoke channel is reduced. The geometry of the fan will further determine the shape of this trend. Each of the fan types can be seen inset in the plot, with the impeller design 30' on top and the bladed fan design 30" on bottom. The x-axis is distance from the outer diameter of the fan (mm), which negative distance being closer to an axis of rotation of the fan and positive distance being outside the bounds of the outer diameter of the fan. The y-axis is flow rate through the smoke channel. The data, divided into two tables, is as follows:

| Impeller Fan Design | | Bladed Fan Design | |
| --- | --- | --- | --- |
| Distance from Fan Outer Diameter (mm) | Flow Rate (mL/s) | Distance from Fan Outer Diameter (mm) | Flow Rate (mL/s) |
| −50 | 740 | −28 | 470 |
| −40 | 670 | −18 | 310 |
| −30 | 610 | −8 | 80 |
| 0 | 480 | 2 | −60 |
| 5 | 440 | 12 | −100 |
| 10 | 350 | 22 | −120 |
| 15 | 310 | | |
| 20 | 250 | | |

Figure 18:
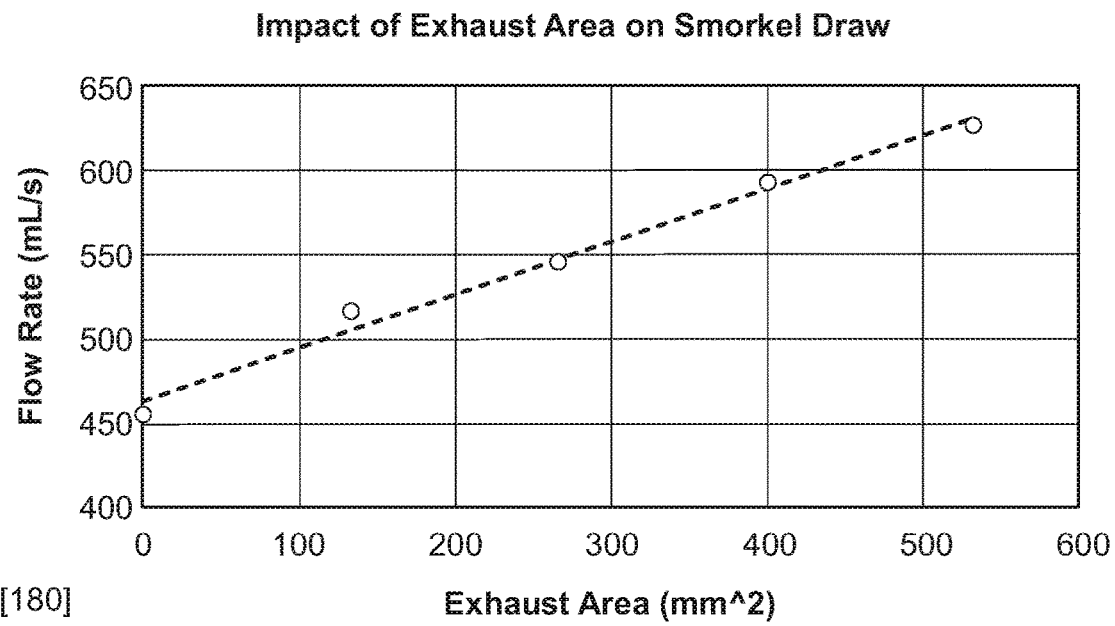
FIG. 18 is a plot detailing a relationship between area of an exhaust vent and draw through a smoke channel.

FIG. 18 depicts a plot 180 detailing the relationship between area of exhaust (mm²) (e.g., vents, gaps in the cooking device leading to the interior cooking chamber, etc.) in a cooking device and flow rate (mL/s) through a smoke channel. Generally, as the area of exhaust increases, flow rate increases. The data is as follows:

| Exhaust Area (mm²) | Flow Rate (mL/s) |
| --- | --- |
| 0 | 450 |
| 140 | 520 |
| 270 | 550 |
| 400 | 590 |
| 540 | 630 |

Figure 19:
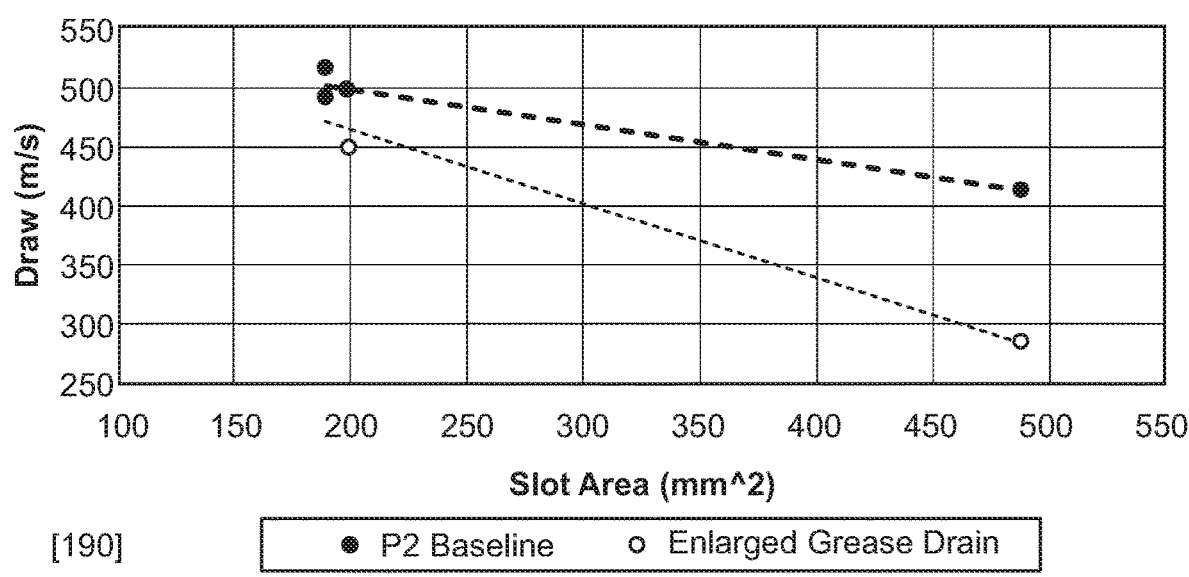
FIG. 19 is a plot detailing a relationship between the area of an ancillary opening and flow rate through a smoke channel.

FIG. 19 depicts a plot 190 of the impact the recirculation opening 110 presence and size of any other openings (e.g., a grease drain, not pictured) can have on smoke draw at 1000 RPM. The plot 150 features slot area (mm²) on the x-axis and draw (m/s) on the y-axis. In the case of a grease drain (not pictured), for example, the grease drain itself can be in fluid communication with an interior of the cooking device (e.g., cooking device 10) and an exterior of the device in order to allow for the drainage of grease. This pathway can likewise serve as a point of air exchange-either into or out of the system-depending upon the relative pressure at the opening. Increasing an area of the grease drain can lead to an increased exchange of air and smoke through the grease drawn. FIG. 19 depicts a variation where the grease drain is acting like an air inlet. As the grease drain increases in area, flow through cooking device (in the form of Draw) decreases.

Figure 20:
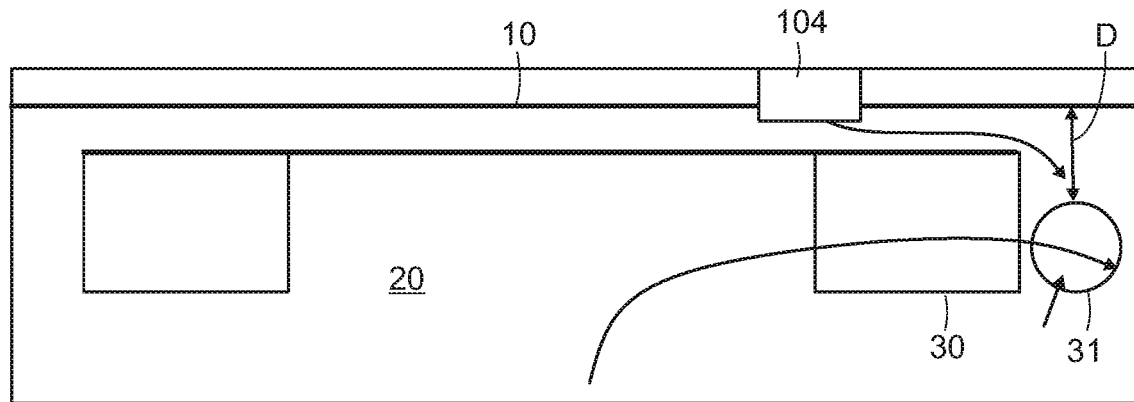
FIG. 20 is a simplified side view of the cooking device of FIG. 1 having a fan with a certain fin height and a flow concentration relative to the fin height.
Figure 21:
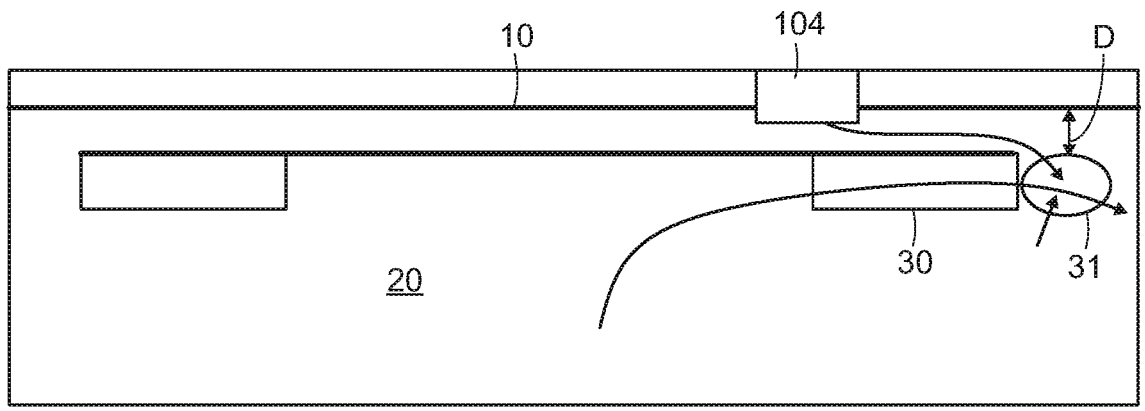
FIG. 21 is a simplified side view of the cooking device of FIG. 1 having a fan with a reduced fin height and a flow concentration relative to the fin height.

FIGS. 20-21 depicts a simplified, cross-sectional comparison showcasing the relationship between the cooking device 10 with a fan 30 having a fan fin height and flow rate through a smoke channel at 1000 RPM. On each side, a flow path and a flow concentration are highlighted relative to the fan 30. In FIG. 20, a fan 30 with a 28 mm fin height is depicted. At 1000 RPM, the flow rate through a smoke channel 100 is approximately 306 mL/s. In FIG. 21, a fan 30 with a 10 mm fin height is depicted. At 1000 RPM, the flow rate through a smoke channel 100 is approximately 563 mL/s. In general, lowering the fin height of a fan can cause a flow concentration 31 to move closer to a top of the interior cooking chamber 20 and closer to the second end 104 of a smoke channel 100. This reduction in distance (D) between the flow concentration 31 and an interior of the cooking device 10 can cause smoke to be drawn through the smoke channel 100 at a faster rate.

As explained above, the cooking devices 10, 10' can include variable smoke systems that can vary an amount of smoke entering an interior cooking chamber (e.g., interior cooking chamber 20). These systems can generally be referred to as limiters, as-in they limit an amount of smoke entering the interior cooking chamber via the smoke channel (e.g., smoke channel 100). In addition to the baffle 46, described above, other systems and elements can be used. FIGS. 22-27 depict variable smoke systems. While description will be made with respect to cooking device 10, smoke channel 100, and their respective features, the variable smoke systems can be used with any of the cooking devices and smoke channels described herein.

Figure 22:
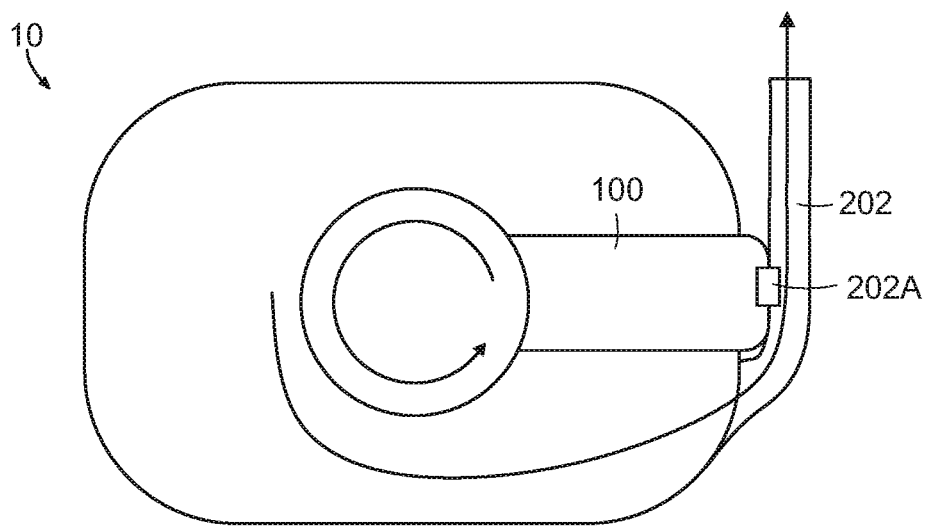
FIG. 22 is a simplified top view of the cooking device of FIG. 1 having an extended exhaust.

FIG. 22 depicts a simplified top view of the cooking device 10 having an exhaust 202 that is configured to recycle a portion of the exhaust flow to be reused over the top of pellets stored within the smoke unit 40 (not shown in FIG. 22). The exhaust 202 can be positioned on the cooking device to take advantage of prevailing airflow moving through the interior cooking chamber 20. A portion of the smoke leaving through the exhaust 202 can be recirculated within the interior cooking chamber 20, such as via an opening 202A in the exhaust 202. The presence of recirculated air can decrease the draw of new air through the smoke unit 40 and through the smoke channel 100, thereby reducing the introduction of new smoke into the interior cooking chamber 20.

Figure 23:
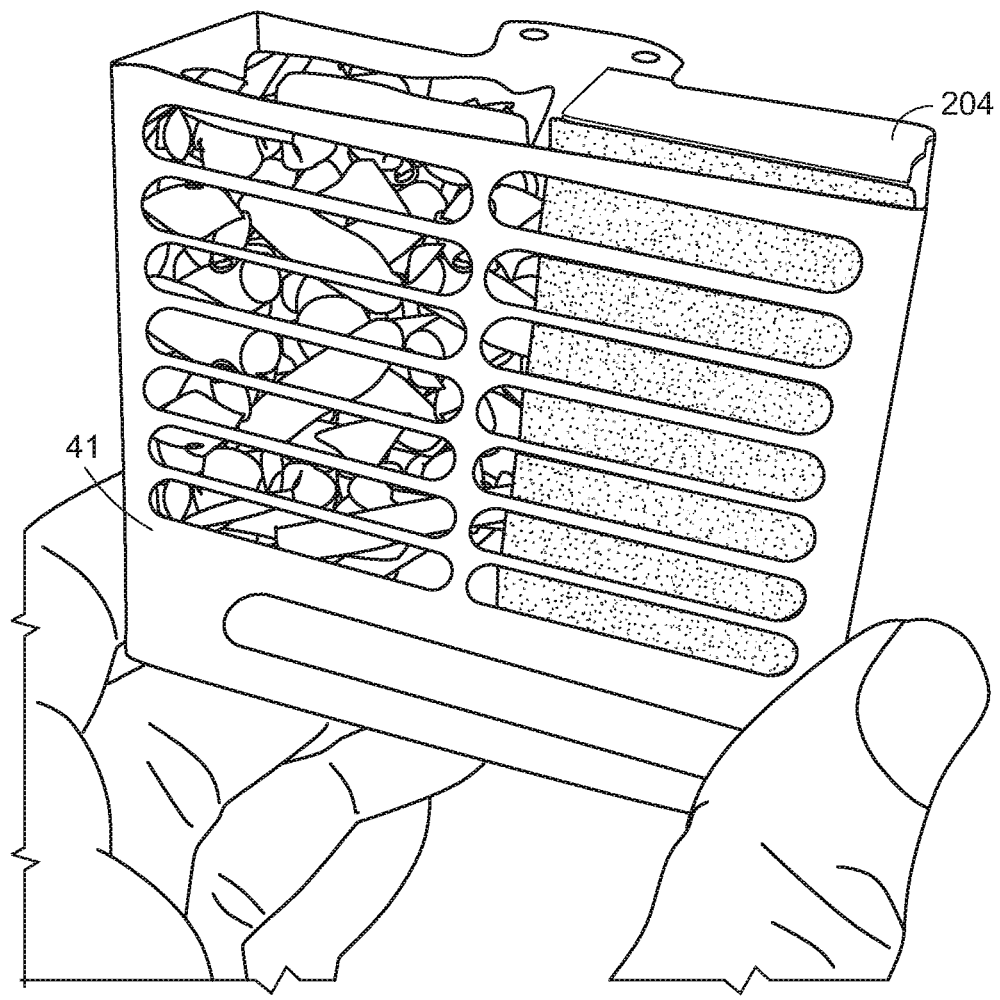
FIG. 23 is a perspective view of a fuel box usable with the cooking device of FIG. 1 having a block positioned therein.

FIG. 23 depicts a fuel box 41 that can be used with smoke unit 40 to contain a fuel source for the generation of smoke. A block 204 can be positioned within the fuel box in order to occupy potential fuel source space. The block 204 can be made of any material, including various metals, ceramics, fiberglass, etc. During a smoke procedure, the fuel source contained within the fuel box 41 only occupies a fractional portion of the fuel box 41, and as a result, the fuel source can be burned at a slower rate, thereby generating less smoke to enter the cooking device 10. In some variations, the fuel source can be burned top-down. The overall cross-sectional area of the fuel can determine an intensity of a burn, which translates to an intensity of smoke generation. The overall height of the fuel source within the fuel box 41 can determine a burn time, which translates to a total time that smoke can be produced. Block 204 can occupy a large portion of the fuel box 41, which can change the specific intensity and/or burn time of the fuel. For example, by positioning block 204 in a vertical orientation as seen in FIG. 23, an intensity of the burn of pellets can be reduced compared to a fuel box 41 with pellets but without block 204, but a burn time can be approximately equal to the fuel box 41 with pellets but without block 204. In another example, by positioning block 204 in a horizontal orientation such that it occupies an entire lower region of the fuel box 41, the relative intensity burns in the exemplary fuel boxes 41 can be approximately equal, but the fuel box 41 with the block 204 can have a reduced burn time.

Figure 24C:
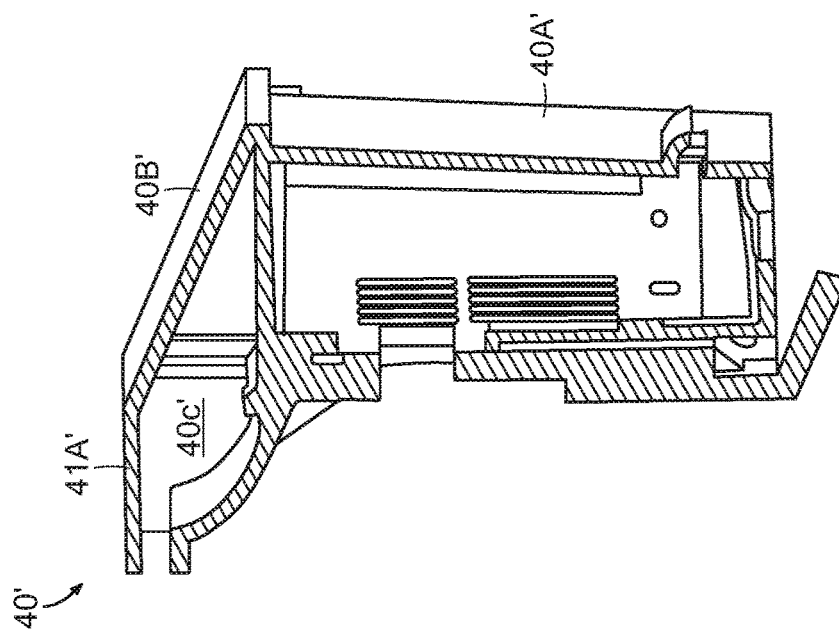
FIG. 24C is a cross-sectional view of the smoke unit of FIG. 24A having a lid pivoted to an open position.
Figure 24B:
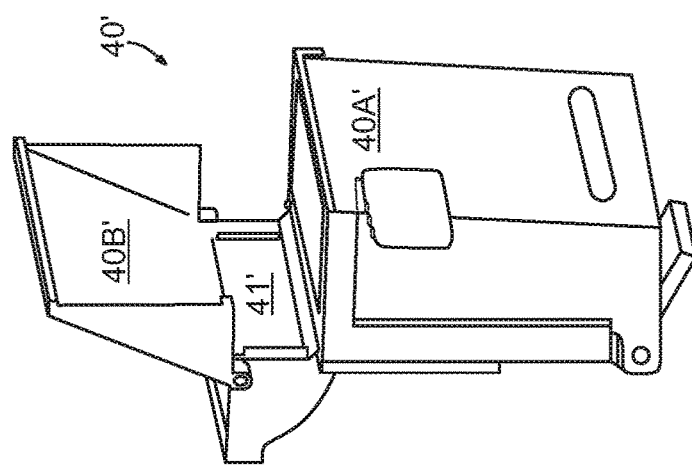
FIG. 24B is a perspective view of the smoke unit of FIG. 24A having a lid pivoted to an open position.
Figure 24A:
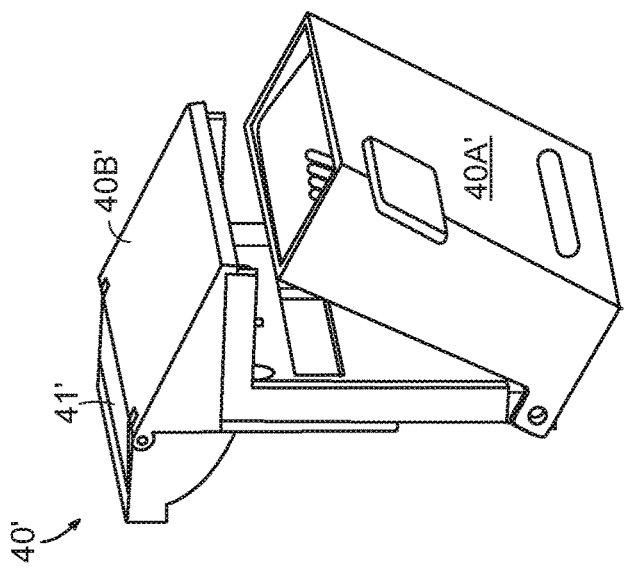
FIG. 24A is a perspective view of a smoke unit having a body pivoted to an open position according to an embodiment.

FIGS. 24A-24C depict a smoke unit 40' that is usable with any of the cooking devices described herein. The smoke unit 40' can include a body 40A' that can pivot away from the rest of the smoke unit 40' and a lid 40B' that can pivot upward and away from the body 40A'. The lid 40B' can also include an extension 41' extending past a pivot point, such that when the lid 40B' is pivoted upward, the extension 41' is pivoted downward. Smoke generated by the smoke unit 40' can flow into a cooking device (e.g., cooking device 10) via an opening 40C'. The body 40A' can be pivoted to assist in adding fuel to the smoke unit 40'. During a smoke procedure, if the the lid 40B' is pivoted as depicted in FIG. 24B, the extension 41' can pivot downward to obstruct the opening 40C', and smoke generated by the combustion of fuel can flow away from the smoke unit 40' without entering the interior cooking chamber 20 of the cooking device 10. FIG. 24C depicts a cross-sectional view of the smoke unit 40', and the opening 40C' is depicted more clearly.

Figure 25A:
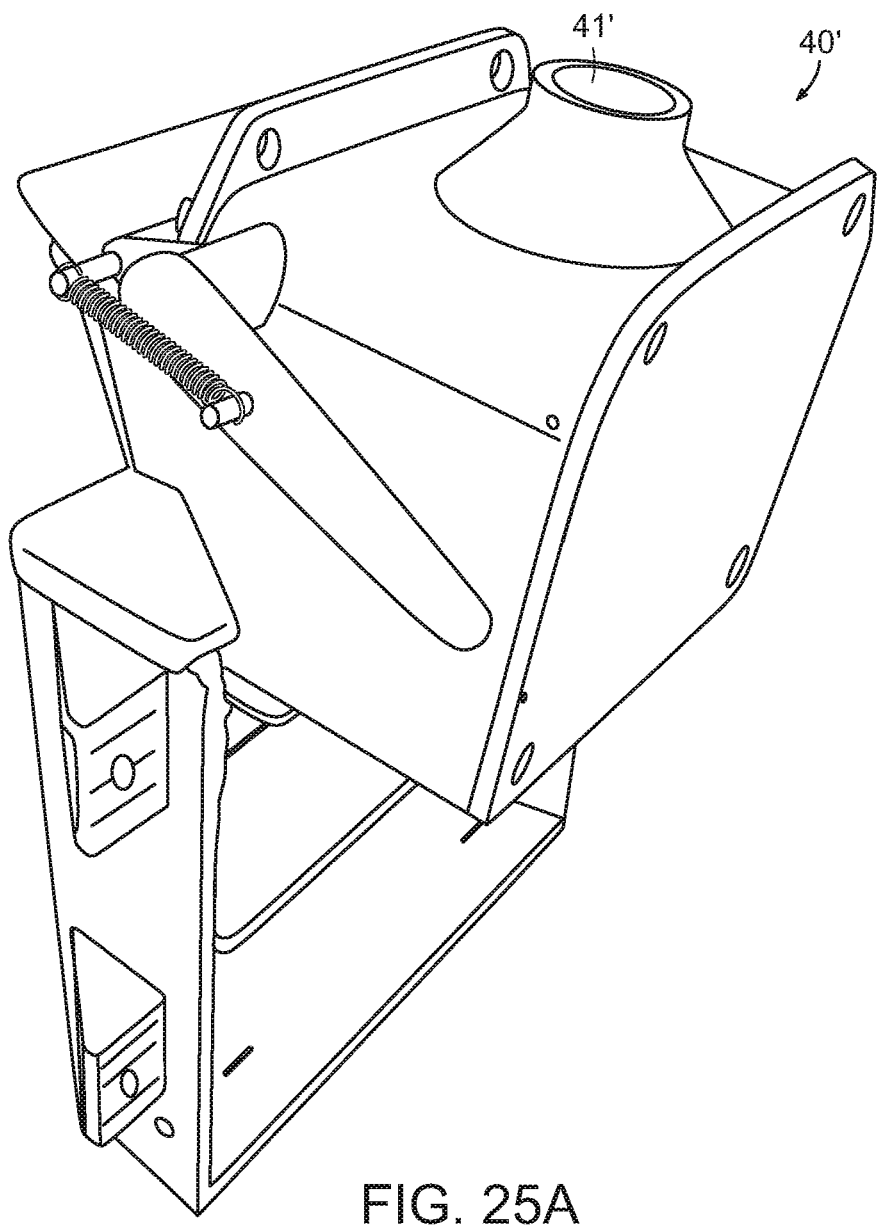
FIG. 25A is a perspective view of a smoke unit having a butterfly valve according to another embodiment.
Figure 25B:
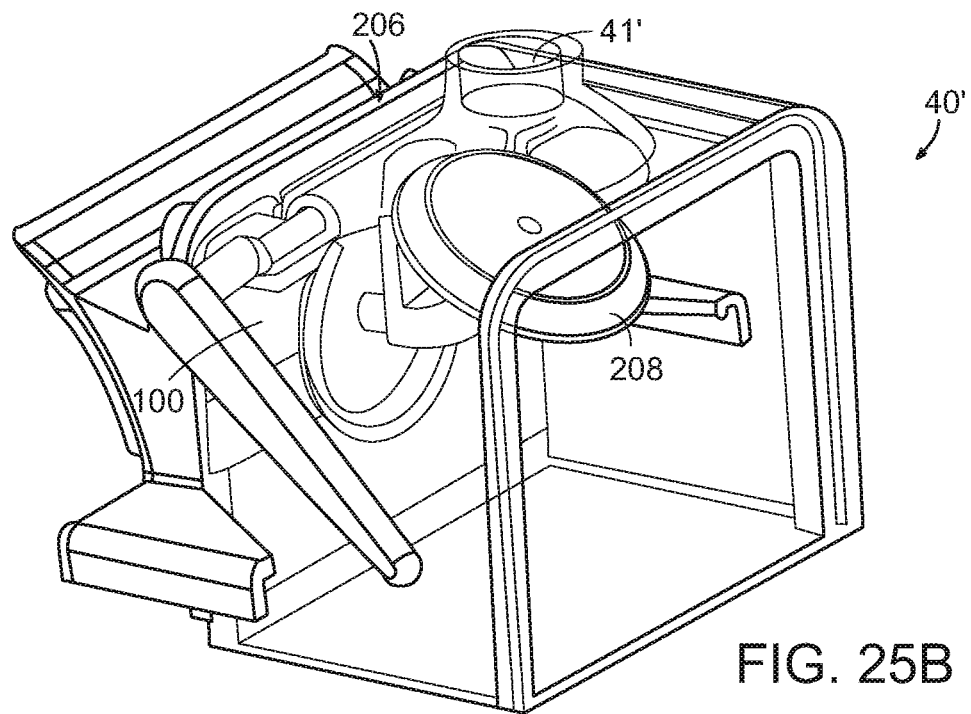
FIG. 25B is a transparent perspective view of a lid of the smoke unit of FIG. 25A.

FIGS. 25A and 25B depict a variation of the smoke unit 40' that uses a butterfly valve assembly 206 to control an amount of smoke entering the interior cooking chamber 20. The butterfly valve assembly 206 can include a butterfly valve 208 that is pivotal between a first position in which the smoke channel 100 is blocked off and an opening 41' in the smoke unit 40' is exposed, and a second position in which the opening 41' is blocked off and the smoke channel 100 is exposed. In variations using the butterfly valve assembly 206, the smoke unit 40' may or may not include the pivotal body 40A' and lid 40B'.

Figure 26:
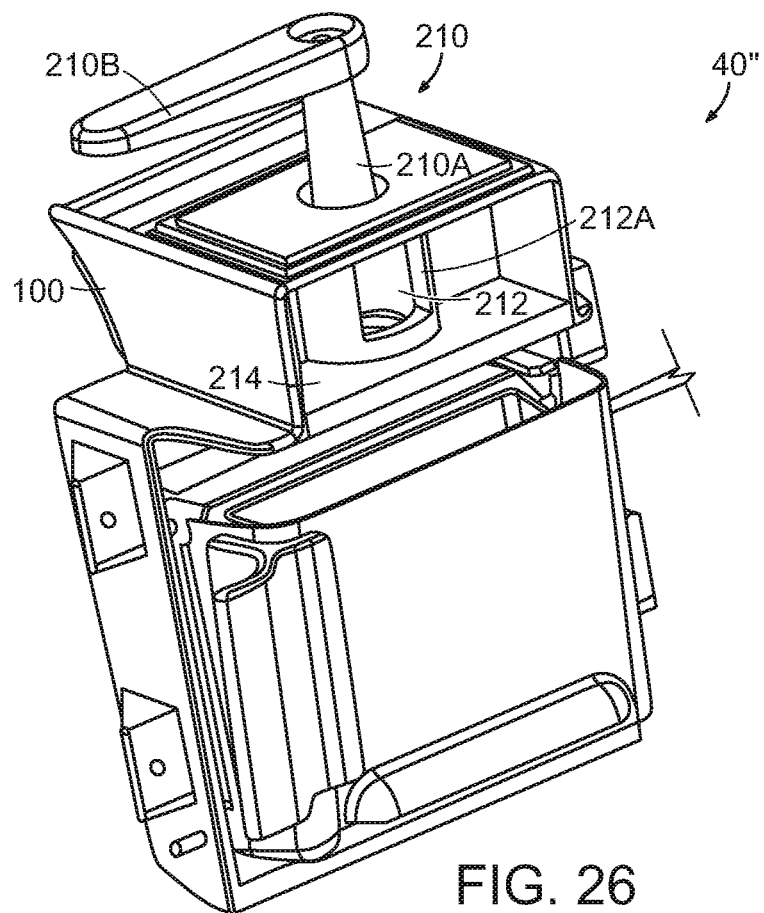
FIG. 26 is a perspective view of a smoke unit having a ball valve according to another embodiment.

FIG. 26 depicts a smoke unit 40" that includes a ball valve system 210. The ball valve system 210 can include a ball valve 210A coupled to a ball valve lever 210B. The ball valve lever 210B can be actuated to cause the ball valve 210A to rotate between a first position in which an opening 212 in the ball valve 210A is positioned to face an outlet 214 of the smoke unit 40", and a second position in which the opening 212 is positioned to face the smoke channel 100. The ball valve lever 210B can be manually actuated to move (such as by rotation), between the first and second positions. The ball valve 210A can include a sharp edge 212A around the opening 212, and the action of manually actuating the ball valve lever 210B can cause the sharp edge 212A to break away creosote the has built up near the ball valve assembly 210.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking device, comprising:
   a housing defining an interior chamber configured to receive a food product;
   a smoke unit coupled to an exterior of the housing, the smoke unit configured to generate smoke, the smoke unit including an outer body and a fuel cartridge removably disposed within the outer body, the fuel cartridge being configured to retain fuel during combustion of the fuel to generate smoke;
   a fan disposed within the interior chamber, the fan configured to draw air along a flow path initiating within the smoke unit and terminating at a terminal end located in the interior chamber, the fan located at the terminal end and being configured to create a low-pressure zone to cause smoke generated by the smoke unit to travel along the flow path, the fan being operable in a first cooking mode to cook the food product in the interior chamber with convection heating; and
   a valve disposed at least partially in the flow path, the valve being movable between a first position in which the flow path is blocked and a second position in which the flow path is unobstructed.

2. The cooking device of claim 1, wherein the smoke unit includes a vent in fluid communication with ambient air, and wherein the valve obstructs the vent in the second position.

3. The cooking device of claim 1, wherein the valve is a butterfly valve configured to pivot between the first position and the second position.

4. The cooking device of claim 1, wherein the valve is a ball valve coupled to a handle extending from the smoke unit, the ball valve being movable via rotation of the handle.

5. The cooking device of claim 4, wherein the ball valve includes a sharpened edge configured to break creosote buildup.

6. A cooking device, comprising:
   a base and a lid movably coupled to the base, the base and the lid defining an interior chamber configured to cook a food product disposed therein;
   a smoke unit coupled to an external surface of the lid and configured to generate smoke to flavor the food product, the smoke unit including an outer body and a fuel cartridge removably disposed within the outer body, the fuel cartridge defining at least one aperture through which fuel retained within the fuel cartridge is ignitable;
   a fan disposed within the interior chamber, the fan configured to draw air along a flow path initiating within the smoke unit and terminating in the interior chamber, the fan being located at the terminal end and configured to create a low-pressure zone to cause smoke generated by the smoke unit to travel on the flow path to the interior chamber; and
   a limiter in fluid communication with the flow path, the limiter being configured to reduce a volume of smoke flowing through the smoke channel,
   wherein the fan is operable in a first cooking mode to cook the food product with convection heating.

7. The cooking device of claim 6, wherein the smoke unit includes a vent, and wherein the limiter is disposed at least partially within the smoke unit and includes a valve selectively movable between a first position in which the flow path is unobstrucated and the vent is obstructed by the valve and a second position in which the flow path is obstructed by the valve and the vent is open.

8. The cooking device of claim 7, wherein the valve is a butterfly valve configured to pivot between the first position and the second position.

9. The cooking device of claim 7, wherein the valve is a ball valve coupled to a handle extending from the smoke unit, the ball valve being movable via rotation of the handle.

10. A cooking device:
    a base and a lid movably coupled to the base, the base and the lid defining an interior chamber configured to cook a food product disposed therein;
    a smoke unit coupled to an external surface of the lid and configured to generate smoke to flavor the food product;
    a fan disposed within the interior chamber, the fan configured to draw air along a flow path initiating within the smoke unit and terminating in the interior chamber, the fan being located at the terminal end and configured to create a low-pressure zone to cause smoke generated by the smoke unit to travel on the flow path to the interior chamber; and
    a limiter in fluid communication with the flow path, the limiter comprising a solid block disposed within the smoke unit and configured to reduce a fuel capacity of the smoke unit and being configured to reduce a volume of smoke flowing through the smoke channel,
    wherein the fan is operable in a first cooking mode to cook the food product with convection heating.

11. A cooking device, comprising:
    a base and a lid movably coupled to the base, the base and the lid defining an interior chamber configured to cook a food product disposed therein;
    a smoke unit coupled to an external surface of the lid and configured to generate smoke to flavor the food product, the smoke unit including an outer body and a fuel cartridge removably disposed within the outer body, the fuel cartridge defining at least one aperture through which fuel retained within the fuel cartridge is ignitable;
    a fan disposed within the interior chamber, the fan configured to draw air along a flow path initiating within the smoke unit and terminating in the interior chamber, the fan being located at the terminal end and configured to create a low-pressure zone to cause smoke generated by the smoke unit to travel on the flow path to the interior chamber;
    a limiter in fluid communication with the flow path, the limiter being configured to reduce a volume of smoke flowing through the smoke channel; and
    an exhaust extending from the lid, wherein the limiter includes a recirculation opening on the exhaust to fluidly link the exhaust and the interior chamber, wherein the fan is operable in a first cooking mode to cook the food product with convection heating.

12. A method of cooking, comprising:
loading a fuel cartridge containing a combustible fuel into an outer body, the fuel cartridge and the outer body forming a smoke unit, the smoke unit being coupled to an external surface of a housing of a cooking device, the housing defining an interior chamber configured to receive a food product;
generating smoke using the smoke unit by combusting the combustible fuel contained within the fuel cartridge;
operating a fan disposed within the interior chamber
to draw air along a flow path initiating within the smoke unit and having a terminal end in the interior chamber, and
to cook food through convection heating, the fan being located at the terminal end; and
actuating a limiter to reduce an amount of smoke drawn into the first end of the smoke channel.

13. The method of cooking of claim 12, wherein the smoke unit includes a vent, and wherein the limiter includes a valve that, when the limiter is actuated, is moved from a first position in which the flow path is unobstructed and the vent is obstructed by the valve to a second position in which the flow path is obstructed by the valve and the vent is unobstructed.

14. The method of cooking of claim 13, wherein the valve is a butterfly valve that, when the limiter is actuated, pivots between the first position and the second position.

15. The method of cooking of claim 13, wherein the valve is a ball valve coupled to a handle extending from the smoke unit that, when the limiter is actuated, rotates between the first position and the second position.

* * * * *